(12) United States Patent
Kobayashi et al.

(10) Patent No.: US 9,216,428 B2
(45) Date of Patent: Dec. 22, 2015

(54) SPINDLE SYSTEM AND ELECTROSTATIC PAINTING SYSTEM

(75) Inventors: Naoya Kobayashi, Fujisawa (JP); Tsuyoshi Nakamura, Fujisawa (JP); Atsushi Takahashi, Fujisawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 13/820,697

(22) PCT Filed: Aug. 8, 2012

(86) PCT No.: PCT/JP2012/005048
§ 371 (c)(1),
(2), (4) Date: Mar. 4, 2013

(87) PCT Pub. No.: WO2013/065216
PCT Pub. Date: May 10, 2013

(65) Prior Publication Data
US 2014/0246524 A1    Sep. 4, 2014

(30) Foreign Application Priority Data

Nov. 4, 2011  (JP) ................................. 2011-242738
May 17, 2012  (JP) ................................. 2012-113768
May 25, 2012  (JP) ................................. 2012-119724

(51) Int. Cl.
*F01D 1/02* (2006.01)
*B05B 5/03* (2006.01)
(Continued)

(52) U.S. Cl.
CPC ................ *B05B 5/03* (2013.01); *B05B 3/1035* (2013.01); *B05B 5/0415* (2013.01); *F01D 1/026* (2013.01);
(Continued)

(58) Field of Classification Search
CPC ............................ B05B 5/0415; B05B 5/0407
USPC ...................... 239/7, 690–700; 415/202, 229; 384/100, 107
See application file for complete search history.

(56) References Cited

U.S. PATENT DOCUMENTS 5,660,480 A * 8/1997 Fujii et al. ...................... 384/107
6,312,220 B1 * 11/2001 Horner ......................... 415/199.2
(Continued)

FOREIGN PATENT DOCUMENTS

CN    101564715 A    10/2009
CN    102639816 A    8/2012
(Continued)

OTHER PUBLICATIONS

International Preliminary Report on Patentability (PCT/IB/338) and (PCT/IB/373) dated Jun. 12, 2014, including Written Opinion (PCT/ISA/237) (five (5) pages).
(Continued)

*Primary Examiner* — Len Tran
*Assistant Examiner* — Tuongminh Pham
(74) *Attorney, Agent, or Firm* — Crowell & Moring LLP

(57) ABSTRACT

Each spindle system turbine blade has front and rear surfaces relative to the rotational direction. The rear surface is a recessed columnar surface with a radius of curvature R1, while the front surface is a smooth continuous surface having a projecting columnar surface with a radius of curvature R2 larger than R1 and a flat surface between which a projecting columnar surface with a radius of curvature R3 larger than R1 is arranged. Among the three surfaces, the projecting columnar surface is at an inlet side of a channel straddling the projecting columnar surface, while the flat surface is at the outlet side. A space sandwiched between a facing front surface and rear surface of adjoining turbine blades forms a gas channel. Gas ejected from a nozzle flows in from an inlet in a direction along the arc-shaped curve of the recessed columnar surface and out an outlet.

10 Claims, 7 Drawing Sheets

(51) Int. Cl.
  *B05B 3/10* (2006.01)
  *F16C 32/06* (2006.01)
  *B05B 5/04* (2006.01)
  *F16C 32/04* (2006.01)

(52) U.S. Cl.
  CPC ......... *F16C 32/0618* (2013.01); *F16C 32/0674* (2013.01); *F16C 32/0696* (2013.01); *B05B 5/0407* (2013.01); *F16C 32/0417* (2013.01)

(56) References Cited

U.S. PATENT DOCUMENTS

| | | | | |
|---|---|---|---|---|
| 6,524,070 | B1* | 2/2003 | Carter | 416/193 A |
| 7,249,928 | B2* | 7/2007 | Klasing et al. | 415/115 |
| 7,322,793 | B2* | 1/2008 | Baumann et al. | 415/202 |
| 8,038,385 | B2* | 10/2011 | Kawai et al. | 415/80 |
| 8,382,426 | B2* | 2/2013 | Itoh et al. | 415/143 |
| 2001/0014281 | A1* | 8/2001 | Uesugi et al. | 415/111 |
| 2002/0102158 | A1* | 8/2002 | Otsuka | 415/199.4 |
| 2003/0053909 | A1* | 3/2003 | O'Hearen | 415/202 |
| 2003/0169951 | A1 | 9/2003 | Nishijima et al. | |
| 2004/0184916 | A1 | 9/2004 | Schmitt | |
| 2007/0257131 | A1* | 11/2007 | Brett et al. | 239/223 |
| 2009/0246032 | A1* | 10/2009 | Stone et al. | 416/223 R |
| 2010/0284638 | A1* | 11/2010 | Hirata | 384/100 |

FOREIGN PATENT DOCUMENTS

| | | | |
|---|---|---|---|
| JP | 52-137523 | A | 11/1977 |
| JP | 2003-278751 | A | 10/2003 |
| JP | 2004-232635 | A | 8/2004 |
| JP | 2006-300024 | A | 11/2006 |
| JP | 2008-511432 | A | 4/2008 |
| JP | 2009-243461 | A | 10/2009 |
| JP | 4546103 | B2 | 9/2010 |

OTHER PUBLICATIONS

International Search Report (PCT/ISA/210 & PCT/ISA/220) dated Oct. 16, 2012 with partial English translation (Four (4) pages).

English-language translation of document C1 (International Search Report) previously filed on Mar. 4, 2013 (Two (2) pages).

Extended European Search Report dated Jun. 24, 2015 (Five (5) pages).

Chinese Office Action dated Jul. 23, 2015, with partial English translation (Ten (10) pages).

* cited by examiner

SPINDLE SYSTEM AND ELECTROSTATIC PAINTING SYSTEM

TECHNICAL FIELD

The present invention relates to a spindle system and an electrostatic painting system.

BACKGROUND ART

For example, Patent Documents 1 and 2 disclose an impulse type turbine impeller which is used for a spindle system or paint spraying system. This turbine impeller is provided with a plurality of turbine blades which receive gas which is ejected from nozzles. The turbine blades are specially designed in shape so as to improve the efficiency of converting the impact force of the ejected gas to a rotational drive force of the turbine impeller.

Specifically, each of the turbine blades is provided with a rear curved surface which is oriented to the rear in the rotational direction of the turbine impeller and receives the gas and with a front curved surface which is oriented to the front in the rotational direction of the turbine impeller and faces a rear curved surface of the adjoining turbine blade, but it is possible to define the rates of curvature of the two curved surfaces so as to improve the exhaust efficiency of the gas from the turbine impeller. As a result, low flow rate gas is used to realize high speed rotation and high torque.

CITATIONS LIST

Patent Documents

Patent Document 1: JP 2006-300024 A
Patent Document 2: JP 4546103 B
Patent Document 3: JP 2008-511432 A

SUMMARY OF THE INVENTION

Problem to be Solved

The turbine impellers of Patent Documents 1 and 2 convert the impact force of ejected gas efficiently to rotational drive force of the turbine impeller, but it has been desired to further convert the kinetic energy of the gas to rotational drive force by a high efficiency.

Therefore, the present invention has as its object to solve the above problem of the prior art and to provide a spindle system and an electrostatic painting system which convert the kinetic energy of gas to rotational drive force at a high efficiency.

Solution to Problem

To solve this problem, the aspects of the present invention are configured as follows: That is, a spindle system according to one aspect of the present invention is provided with a substantially tubular housing, a rotary shaft which is inserted through the housing and is supported through a bearing in a rotatable manner, a turbine impeller which is provided concentrically with the rotary shaft and which rotates integrally with the rotary shaft, a nozzle which ejects a gas for making the turbine impeller rotate, and a plurality of turbine blades which are formed at the turbine impeller and which receive the gas which is ejected from the nozzle, and satisfies the following five conditions A, B, C, D, and E:

Condition A: The plurality of turbine blades are arranged in a ring along an outer circumference of the turbine impeller, and the intervals between adjoining turbine blades are equal intervals.

Condition B: Each turbine blade is provided with a front surface which is oriented to a front in a rotational direction of the turbine impeller and a rear surface which is oriented to a rear in a rotational direction of the turbine impeller.

Condition C: The rear surface is a recessed columnar surface which has a radius of curvature R1, while the front surface is a smooth continuous surface comprised of a projecting columnar surface which has a radius of curvature R3 smaller than R1 arranged between a projecting columnar surface which has a radius of curvature R2 larger than R1 and a flat surface.

Condition D: A space which is sandwiched between a facing front surface and rear surface of two adjoining turbine blades forms a channel through which the gas flows in a direction along an arc-shaped curve of the recessed columnar surface, and gas which is ejected from the nozzle flows in from an opening at one end side of the channel, flows in at a direction along the arc-shaped curve of the recessed columnar surface, and flows out from an opening at another end side.

Condition E: The projecting columnar surface which has a radius of curvature R2 among the three surfaces which form the front surface is arranged at an inlet side of the channel across the projecting columnar surface which has a radius of curvature R3, and the flat surface is arranged at an outlet side of the channel.

This spindle system may further satisfy the following the three conditions F, G, and H.

Condition F: The turbine impeller is a disk shaped member which is separate from the rotary shaft, a through hole is formed at its center, and the turbine impeller is attached to the rotary shaft which is inserted through the through hole.

Condition G: The plurality of turbine blades are formed at one plate surface of two plate surfaces of the turbine impeller.

Condition H: A deformation suppression part which supports the turbine impeller and which suppresses deformation of the turbine impeller in the axial direction is provided at the rotary shaft adjoining the plate surface at which the turbine blades are not formed among the two plate surfaces of the turbine impeller.

Further, in addition to the above conditions F, G, and H, the spindle system may further satisfy the following condition I.

Condition I: The material which forms the deformation suppression part has a higher tensile strength than the material which forms the turbine impeller.

Alternatively, the spindle system which satisfies the above five conditions A, B, C, D, and E may be configured to further satisfy the following condition J:

Condition J: Each turbine blade is formed projecting out from the surface of the turbine impeller and a shape of the each turbine blade is that a projecting length from the surface of the turbine impeller is not constant.

In a spindle system which satisfies the above six conditions A, B, C, D, E, and J, preferably a shape of a boundary part of a turbine blade with the turbine impeller is that a projecting length from the surface of the turbine impeller is not constant. More preferably, a cross-sectional shape of an outside surface of the boundary part cut at a plane along a projecting direction of the turbine blade is a curve. Further, more preferably the curve is an arc, while preferably the arc has a radius of curvature of 0.1 mm to 0.5 mm.

These spindle systems preferably further satisfy the following three conditions K, L, and M:

Condition K: An angle which is formed between a tangent plane at the outlet-side end of the rear surface and a tangent plane at the outlet-side end of a rotational path of the outlet-side end of this rear surface is 20° to 50°.

Condition L: The flat surface of the front surface faces the rear surface of the adjoining turbine blade, but is parallel with the tangent plane at the outlet-side end of the facing rear surface.

Condition M: A distance B is less than a distance A, where the distance A is a distance between the furthest part from the inlet of the channel in the projecting columnar surface having a radius of curvature R2 and the inlet-side end in the rear surface of the adjoining turbine blade facing the projecting columnar surface, and the distance B is a distance between the flat surface of the front surface and the tangent plane at the outlet-side end of the rear surface of the adjoining turbine blade facing the flat surface.

Further, these spindle systems preferably further satisfy the following condition N.

Condition N: An angle formed between an ejection direction of the gas which is ejected from the nozzle and the inlet-side end of the recessed columnar surface which forms the rear surface which receives the gas is 75° to 105°.

Furthermore, the electrostatic painting system of another aspect of the present invention is characterized by being provided with any of the above spindle systems.

Advantageous Effects of Invention

In the spindle system and the electrostatic painting system of the present invention, the turbine blades of the turbine impeller receive the ejected gas and convert the impact force to rotational drive force of the turbine impeller and also receive the reaction force due to the exhaust of gas from the turbine impeller, so can convert kinetic energy of gas at a high efficiency to rotational drive force.

DESCRIPTION OF EMBODIMENTS

Figure 1:
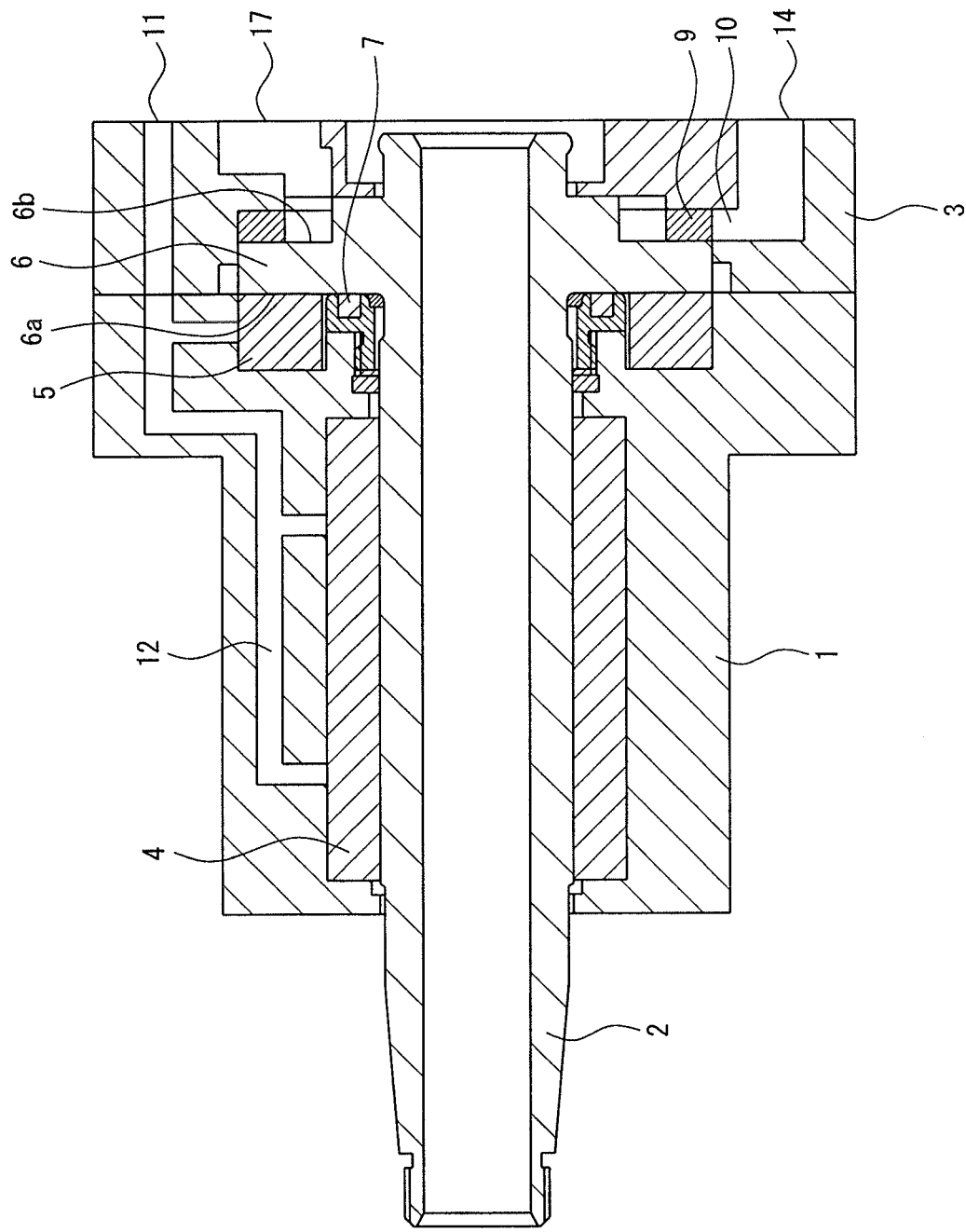
FIG. 1 is a cross-sectional view which shows the structure of a first embodiment of a spindle system according to the present invention.

Embodiments of the spindle system and the electrostatic painting system according to the present invention will be explained in detail while referring to the drawings.

First Embodiment

Figure 2:
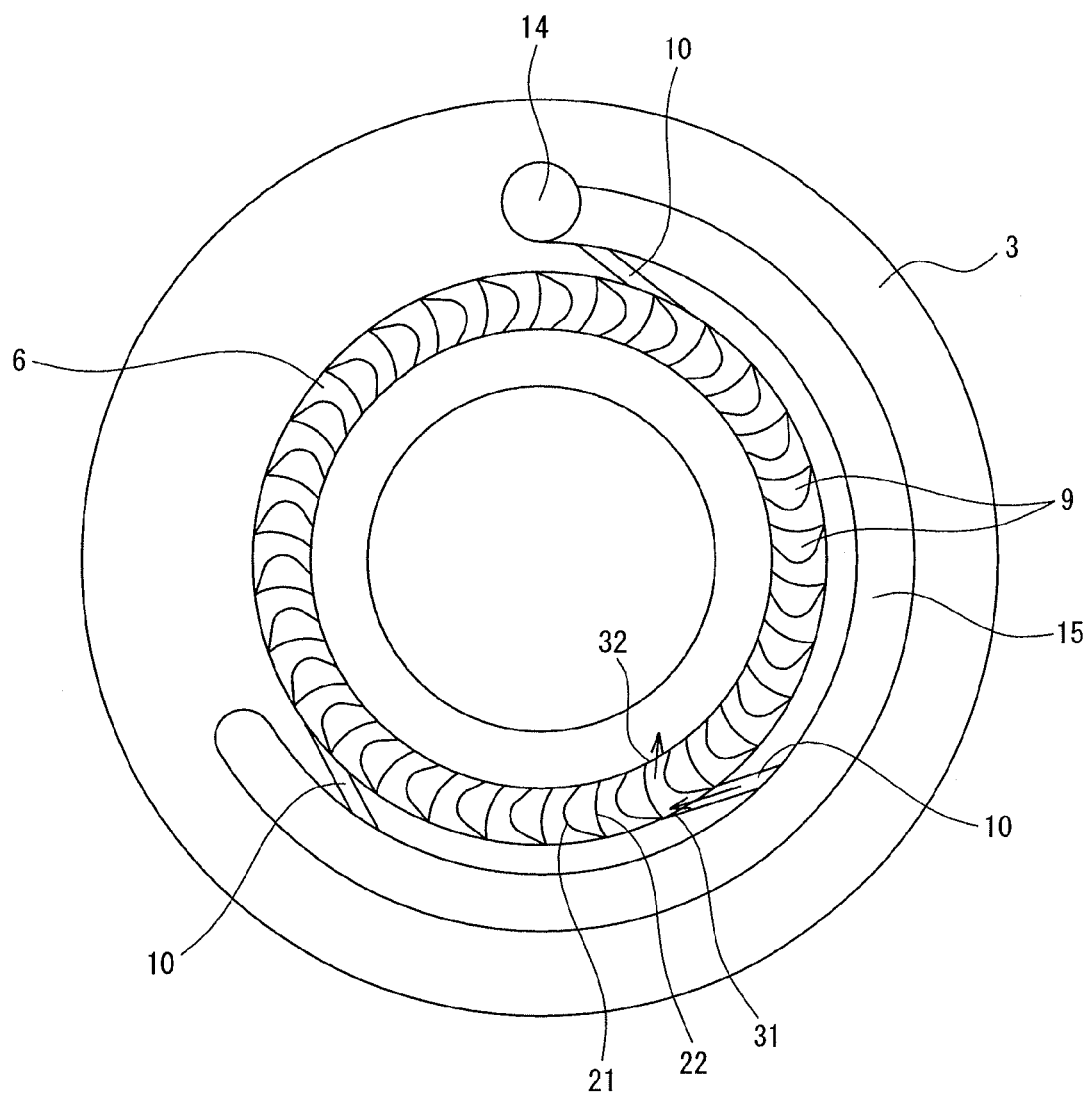
FIG. 2 is a view which shows the structure of a turbine impeller and its peripheral parts of the spindle system of FIG. 1.
Figure 3:
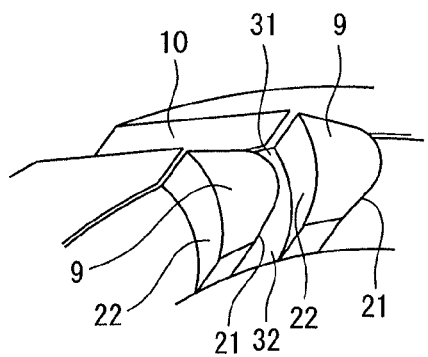
FIG. 3 is a perspective view which shows enlarged a turbine blade and nozzles of the spindle system of the first embodiment.
Figure 4:
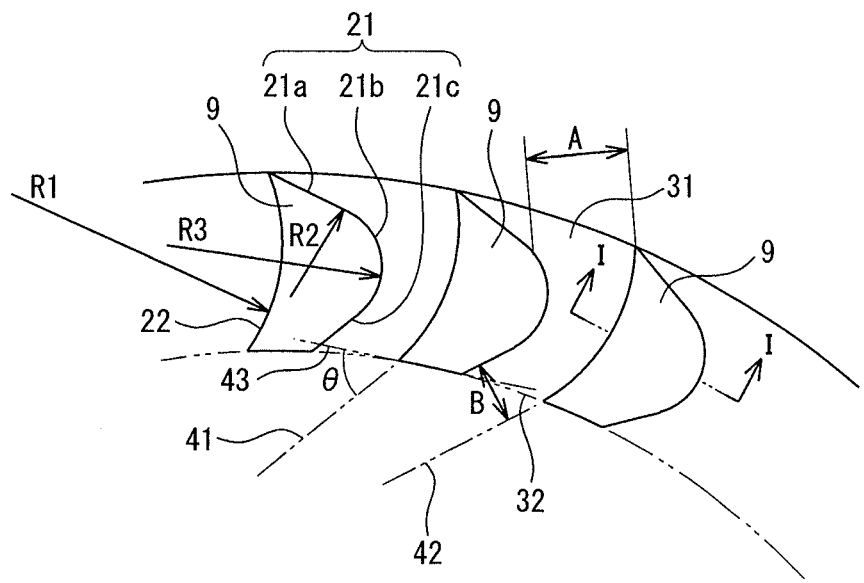
FIG. 4 is a front view which shows enlarged the turbine blades of the turbine impeller of the spindle system of the first embodiment.

FIG. 1 is a cross-sectional view which shows the structure of a first embodiment of a spindle system according to the present invention (cross-sectional view along plane including axis of rotary shaft). Further, FIG. 2 is a view which explains the structure of a turbine impeller and its peripheral parts of the spindle system of FIG. 1. Furthermore, FIG. 3 is a perspective view which shows enlarged turbine blades and a nozzle of the spindle system of the first embodiment. Furthermore, FIG. 4 is a front view which shows enlarge turbine blades of a turbine impeller.

The spindle system of the present embodiment is a spindle system of an air turbine drive type which can be suitably used for an electrostatic painting system, dental use handpiece, etc. and is provided with a substantially tubular housing 1, a substantially tubular gas feed part 3 which is coaxially connected with this housing 1, and a rotary shaft 2 which is inserted in the housing 1 and the gas feed part 3. Further, this rotary shaft 2 is supported by a radial bearing and an axial bearing which are provided at the housing 1 at the inside of the housing 1 and the gas feed part 3 in a rotatable manner. In FIG. 1, the rotary shaft 2 is hollow in shape, but a solid shaft may also be used.

Note that, when using the spindle system of present embodiment, for example, for an electrostatic painting system application, a bell cup painting applicator for scattering and atomizing paint is attached to the rotary shaft 2 in a rotatable manner integrally with it, but in the present embodiment, among the two ends of the rotary shaft 2, the end at the side to which the bell cup is attached (in FIG. 1, the left side) is referred to as the "front end", while the end at the opposite side (in FIG. 1, the right side) is referred to as the "rear end".

Here, a radial bearing will be explained. At the inner circumferential surface of the housing 1, a cylindrical porous member 4 is attached. An inner circumferential surface of this porous member 4 faces an outer circumferential surface of the rotary shaft 2. Further, a bearing-use gas feed path 12 which communicates a bearing-use gas feed port 11 which opens at an outer surface of a gas feed part 3 which is attached to a rear end of the housing 1 and the porous member 4 is formed at the inside of the housing 1 and the gas feed part 3.

Further, gas (for example, air) which is introduced through the bearing-use gas feed path 12 is blown from the inner circumferential surface of the porous member 4 to the outer circumferential surface of the rotary shaft 2 whereby a gas bearing is formed. The movement of the rotary shaft 2 in the radial direction is restricted by this gas bearing, so the rotary shaft 2 is supported in a rotatable manner without the outer circumferential surface contacting the inner circumferential surface of the porous member 4.

Next, an axial bearing will be explained. The rotary shaft 2 has a flange part 6, at the part near the rear end, which projects out in a direction forming a right angle with its axial direction. This flange part 6 is arranged between the rear end side end face of the housing 1 and the gas feed part 3. The flange part 6 need only have a flat surface with forms a right angle with the axial direction. For example, it may be a disk part which projects out from the outer circumferential surface of the rotary shaft 2 and may be a cylindrical part of a larger diameter than the rotary shaft (FIG. 1 shows the case of a disk part).

At the rear end side end face of the housing 1, a magnet 7 (permanent magnet or electromagnet) is attached so as to face a flat surface 6a of the flange part 6. Further, this magnet 7 causes a magnetic force to act on the flat surface 6a of the flange part 6 and causes the flange part 6 to be pulled to the housing 1 (front end side in axial direction).

Further, at the rear end side end face of the housing 1, a porous member 5 is attached so as to face the flat surface 6a of the flange part 6. Further, gas (for example, air) which is introduced through the bearing-use gas feed path 12 is blown from the porous member 5 to the flat surface 6a of the flange part 6. Accordingly, a reaction force acts at the flange part 6, whereby the flange part 6 is pressed against the rear end side in the axial direction.

Further, due to the reaction force which is generated due to gas being blown from the porous member 5 to the flat surface 6a of the flange part 6 and the magnetic force (attraction force) which is generated by the magnet 7 and balances with the reaction force, a composite bearing is formed. Movement of the rotary shaft 2 in the axial direction is restricted by this composite bearing. Accordingly, the rotary shaft 2 is supported in a rotatable manner without the flat surface 6a of the flange part 6 contacting the rear end side end face of the porous member 5.

In this way, due to the radial bearing and axial bearing, the rotary shaft 2 is supported at the housing in a rotatable manner without contacting the housing 1 and the gas feed part 3. Note that, in the present embodiment, the axial bearing was a composite bearing using gas and a magnet, but it may also be a gas bearing. That is, if arranging porous members at the two sides straddling the flange part 6 and blowing gas to the two flat surfaces 6a, 6b of the flange part 6 to form a gas bearing, movement of the rotary shaft 2 in the axial direction is restricted by this gas bearing, so the two flat surfaces 6a, 6b of the flange part 6 are supported in a rotatable manner without contacting the two porous members.

Further, in the present embodiment, the radial bearing is a gas bearing, and this gas bearing is used to support the rotary shaft 2 at the housing 1 in a rotatable manner, but instead of the gas bearing, a roller bearing (for example, an angular ball bearing suitable for high speed rotation) may also be used. That is, if arranging a roller bearing between the inner circumferential surface of the housing 1 and the rotary shaft 2, this roller bearing may be used to support the rotary shaft 2 at the housing 1 in a rotatable manner.

Furthermore, among the two flat surfaces 6a, 6b of the flange part 6, at the opposite side to the flat surface 6a at the side which faces the porous member 5, that is, at the flat surface 6b (that is, the flat surface 6b at the rear end side), a plurality of turbine blades 9 are provided. That is, the flange part 6 forms part of the turbine impeller of the turbine.

Here, the structure of the turbine blades 9 and the peripheral parts will be explained in further detail while referring to FIGS. 1 to 3. At the outward part in the diametrical direction of the flat surface 6b of the disk shaped flange part 6, the plurality of turbine blades 9 are arranged in a ring along the outer circumference of the flange part 6, and the intervals between adjoining turbine blades 9 are equal intervals (corresponding to constituent requirement of present invention of condition A).

Note that, in the present embodiment, the turbine blades 9 are provided so as to project out from the flat surface 6b to the rear end side in the axial direction, but if arranged in a ring along the outer circumference of the flange part 6 and if the gas is suitably blown on them, they may also be provided so as to project out from the outer circumferential surface of the flange part 6 outward in the diametrical direction. Alternatively, it is also possible to provide a cylindrical part so as to project out from the outward part in the diametrical direction of the flange part 6 to the rear end side in the axial direction and possible to provide the turbine blades so as to project out from the inner circumferential surface of this cylindrical part inward in the diametrical direction.

On the other hand, at the part of the inner circumferential surface of the gas feed part 3 which face the turbine blades 9, nozzles 10 which eject gas for making the turbine impeller 6 rotate are provided. The nozzles 10 are oriented in a direction along the tangential direction of the rotational path of the turbine blades 9 and eject gas in the same direction. The number of nozzles 10 is not particularly limited. One or more is possible.

Further, inside the gas feed part 3, a turbine-use gas feed path 15 which connects a turbine-use gas feed port 14 which opens at the outer surface of the gas feed part 3 and the nozzles 10 is formed continuously in the circumferential direction. Accordingly, the gas which is supplied from the turbine-use gas feed port 14 passes through the turbine-use gas feed path 15 to reach the nozzles 10, is ejected from the nozzles 10, and is sprayed from the outward side in the diametrical direction on the turbine blades 9. The turbine-use gas feed path 15 is a gas feed path of a separate system from the bearing-use gas feed path 12, so the gas feed to the bearings can be maintained constant while accurately controlling the gas feed pressure and flow rate of the gas which is supplied to the turbine impeller 6. As a result, the rotational speed of the rotary shaft 2 can be accurately controlled.

Next, the shape of the turbine blades 9 which receive the gas which is ejected from the nozzles 10 will be explained in further detail while mainly referring to FIG. 4.

The turbine blades 9 are provided so as to project out from the flat surface 6b of the flange part 6 to the rear end side in the axial direction. This amount of projection is a magnitude substantially the same as the opening diameter of the nozzles 10. Due to this, the gas which is ejected from the nozzles 10 can be received by the turbine blades 9 efficiently.

Further, the turbine blades 9 are all the same shape. Each is provided with a front surface 21 which is oriented toward the front in the rotational direction of the turbine impeller 6 and a rear surface 22 which is oriented toward the rear in the rotational direction of the turbine impeller 6 (corresponding to constituent requirement of present invention of condition B). This rear surface 22 is a recessed columnar surface which has a radius of curvature R1. The recessed columnar surface is formed so that axis of the recessed columnar surface becomes the same direction as the projecting direction of the turbine blade 9.

On the other hand, the front surface 21 is a smooth continuous surface comprised of a projecting columnar surface 21b having a radius of curvature R3 smaller than R1, arranged between a projecting columnar surface 21a having a radius of curvature R2 larger than R1 and a flat surface 21c (corresponding to constituent requirement of present invention of condition C). At this time, regarding the arrangement of the three surfaces 21a, 21b, and 21c which form the front surface 21, straddling the projecting columnar surface 21b which has the radius of curvature R3, the projecting columnar surface 21a which has a radius of curvature R2 is arranged at the outward side in the diametrical direction and the flat surface 21c is arranged at the inward side in the diametrical direction (corresponding to constituent requirement of present invention of condition E). Further, in the same way as the rear surface 22, the two projecting columnar surfaces 21a, 21b are formed so that the axes of the two projecting columnar surfaces 21a, 21b all become the same direction as the projecting direction of the turbine blades 9 and the flat surface 21c is formed parallel to the projecting direction of the turbine blades 9.

In a space which is sandwiched between a facing front surface 21 and rear surface 22 of two adjoining turbine blades 9, 9, gas is blown from a nozzle 10. The space forms part of a channel of the gas. That is, gas which is ejected from a nozzle 10, as shown in FIG. 2 by the arrows, flows in from an opening 31 at the outward side end in the diametrical direction of the space (below, this opening 31 sometimes being referred to as "inlet 31") and strikes the rear surface 22. Accordingly, the radius of curvature R2 of the projecting columnar surface 21a is preferably a magnitude which does not obstruct the gas which is ejected from the nozzle 10 flowing into the inlet 31. That is, the surface is preferably a columnar one with a small degree of curvature close to a flat surface in shape.

Further, the gas flows in a direction along the arc-shaped curve of the recessed columnar surface which forms the rear surface 22 and, as shown in FIG. 2 by the arrows, flows out from the opening 32 of the end of the space at the inward side in the radial direction (below, this opening 32 sometimes being referred to as the "outlet 32") (corresponding to constituent requirement of present invention of condition D) and is exhausted from the turbine-use exhaust port which opens to the outside surface of the gas feed part 3 to the outside of the spindle system.

Further, the rear surface 22 preferably satisfies the following condition. That is, the angle which is formed between the ejection direction of the gas which is ejected from a nozzle 10 and the inlet-side end in the recessed columnar surface which forms the rear surface 22 of a turbine blade 9 which receives the ejected gas is preferably 75° to 105° (corresponding to constituent requirement of present invention of condition N). According to such a configuration, the impact force of the gas which is ejected from the nozzles 10 can be efficiently converted to rotational drive force. To convert the impact force of the gas which is ejected from the nozzles 10 to a rotation drive force with the highest efficiency, the angle formed by the ejection direction of the gas which is ejected from a nozzle 10 and the inlet-side end in the recessed columnar surface which forms the rear surface 22 of a turbine blade 9 which receives the ejected gas is most preferably 90°.

Furthermore, the rear surface 22 which is provided at each turbine blade 9 preferably satisfies the following condition. That is, the angle θ which is formed between a tangent plane 41 at the outlet-side end of the rear surface 22 and a tangent plane 43 at the outlet-side end of the rotational path at the outlet-side end of this rear surface 22 is preferably 20° to 50° (corresponding to constituent requirement of present invention of condition K), particularly preferably is 40°.

Furthermore, the flat surface 21c of the front surface 21 preferably satisfies the following condition. That is, the flat surface 21c of the front surface 21 faces the rear surface 22 of the adjoining turbine blade 9, but is preferably parallel with the tangent plane 42 at the outlet-side end of the rear surface 22 which faces this and the flat surface 21c (corresponding to constituent requirement of present invention of condition L).

Furthermore, when defining a distance between the furthest part from the inlet 31 of the channel in the projecting columnar surface 21a which has a radius of curvature R2 and the inlet-side end in the rear surface 22 of the adjoining turbine blade 9 which faces the projecting columnar surface 21a as "A" and defining a distance between the flat surface 21c of the front surface 21 and the tangent plane 42 at the outlet-side end of the rear surface 22 of the adjoining turbine blade 9 which faces this flat surface 21c as "B" (that is, the length between the two flat surfaces 21c, 42 of the straight line which perpendicularly intersects the parallel flat surface 21c and tangent plane 42 is "B"), the distance B is preferably less than the distance A (corresponding to constituent requirement of present invention of condition M). That is, the width of the outlet 32 of the channel is preferably less than the width of the inlet 31.

Since these conditions K, L, and M are satisfied, the gas which flows in from the inlet 31 to the inside of the channel falls in flow rate once due to striking the rear surface 22, but then is raised in flow rate when passing through the part between the flat surface 21c of the front surface 21 and the rear surface 22. A reaction force occurs right before the gas which is raised in flow rate flows out from the outlet 32 to the outside of the channel and the reaction force is received by the rear surface 22, so the reaction force is converted to rotational drive force together with the impact force of the gas which is ejected from the nozzle 10. Accordingly, compared with a general air turbine drive type spindle system which utilizes only the impact force, it is possible to convert the kinetic energy of the gas to rotational drive force by an extremely high efficiency. As a result, even if using a relatively low flow rate gas, high speed rotation and high torque of the spindle system can be achieved.

Further, in the arts which are disclosed in Patent Documents 1 and 2, the cross-sectional area of a gas channel (the cross-sectional area of the plane which perpendicularly intersects the flow direction of the gas which flows through the inside of the channel) is large, so when fabricating the turbine blades by cutting, the amount of machining becomes large and the machining cost becomes higher, but with the art of the present embodiment, the cross-sectional area of a gas channel is small, so the amount of machining when fabricating the turbine blades 9 by cutting is small and the machining cost is low.

Next, the operation of this spindle system will be explained. If supplying gas made of compressed air etc. to the bearing-use gas feedport 11 which opens at the outer surface of the gas feed part 3 which is attached to the rear end part of the housing 1, this gas passes through the bearing-use gas feed path 12 and reaches the outer circumferential surface side of the porous member 4. Further, the gas passes through the porous member 4 and is ejected from the inner circumferential surface of the porous member 4, is blown on the outer circumferential surface of the rotary shaft 2, is ejected from the rear end side face of the porous member 5, and is blown on the flat surface 6a of the flange part 6.

Due to this, the outer circumferential surface of the rotary shaft 2 and the inner circumferential surface of the porous member 4 enter a noncontact state and the rotary shaft 2 is supported in a floating manner. Furthermore, the reaction force which acts on the flat surface 6a of the flange part 6 causes the rotary shaft 2 to move to the rear end side in the axial direction whereby the flat surface 6a of the flange part 6 and the rear end side end face of the porous member 5 enter a noncontact state. Further, at the position where the magnetic force (attraction force) which is generated by the magnet 7 and its reaction force balance, the rotary shaft 2 is supported in a floating manner.

If supplying gas by compressed air etc. to the turbine-use gas feed path 15 which is formed inside the gas feed part 3 simultaneously with or delayed from the supply of gas to such a gas bearing, the gas which flows through the turbine-use gas feed path 15 reaches the nozzles 10. Gas is blown on the turbine blades 9 of the turbine impeller 6 which is provided concentrically with the rear end side end of the rotary shaft 2, so the rotary shaft 2 is driven to rotate at a high speed together with the turbine impeller 6. At this time, along with the impact force of the gas which is blown against the turbine blades 9 and the reaction force which is generated right before the gas flows out to the outside of the turbine impeller 6 is also converted to rotational drive force, so the kinetic energy of the gas is converted to rotational drive force at an extremely high efficiency.

Such a spindle system of the present embodiment can be applied to an electrostatic painting system. The electrostatic painting system is provided with a spindle system, a bell cup paint applicator (not shown) for scattering and atomizing paint, feed pipes (not shown) for feeding, for example, paint and thinner to the bell cup, and a high voltage generator (not shown) which applies a charge to the paint. A paint feed pipe and thinner feed pipe are inserted through the inside of the hollow rotary shaft 2, while the bell cup is attached to a front end of the rotary shaft 2 in a rotatable manner integrally with it.

The high voltage generator is used to place the inside of the rotary shaft 2 in a high voltage electrostatic field while the gas is blown against the turbine blades 9 of the turbine impeller 8 and makes the rotary shaft 2 rotate at a high speed. In that state, paint and thinner are supplied to the bell cup through the paint feed pipe and thinner feed pipe which pass through the inside of the rotary shaft 2. This being so, electrostatically atomized paint is sprayed from the bell cup which rotates at a high speed at the front end of the rotary shaft 2 on to the painted object. Due to this, the painted object can be painted. If changing the size, shape, etc. of the bell cup, various painted objects can be painted.

Note that, the present embodiment shows one example of the present invention. The present invention is not limited to the present embodiment. For example, if there is no damage due to centrifugal force and damage due to repeated stress, the material of the turbine blades 9 is not particularly limited. Accordingly, if using a small density material to form the turbine blades 9, the time from the start of rotation to when a predetermined rotational speed is reached becomes short, so, for example, when applying the spindle system to an electrostatic painting system, the time for painting work can be shortened.

Further, the type of the gas which is blown on the turbine blades 9 of the turbine impeller 6 is not particularly limited. Compressed air or other air and also nitrogen, steam, or other type of gas can be used.

Example of First Embodiment

Figure 7:
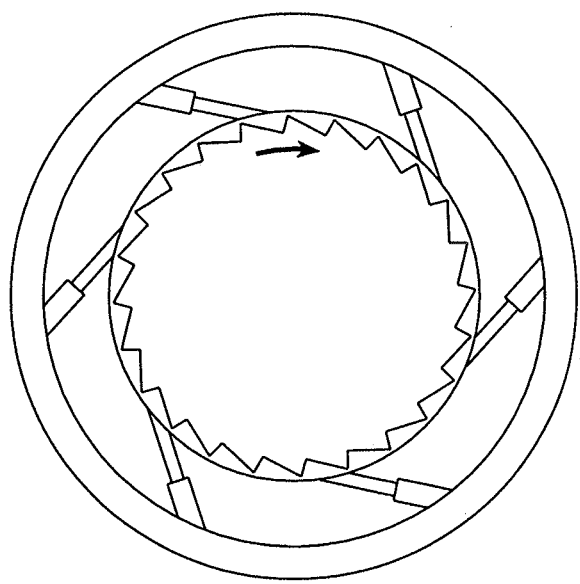
FIG. 7 is a view which explains the structure of a turbine impeller and its peripheral parts of the spindle system of a comparative example.

The spindle system of the above-mentioned present embodiment (working example) and the conventional spindle system such as shown in FIG. 7 (comparative example) are respectively driven to rotate and measured for flow rate of the gas which is blown on the turbine impeller and for rotational speed and torque of the rotary shaft. Note that, a conventional spindle system is a spindle system which is provided with an impact type turbine impeller wherein turbine blades which receive gas which is ejected from the nozzles are formed at the outer circumferential surface of the turbine impeller and which converts only the impact force of the gas which is ejected to rotational drive force.

Figure 5:
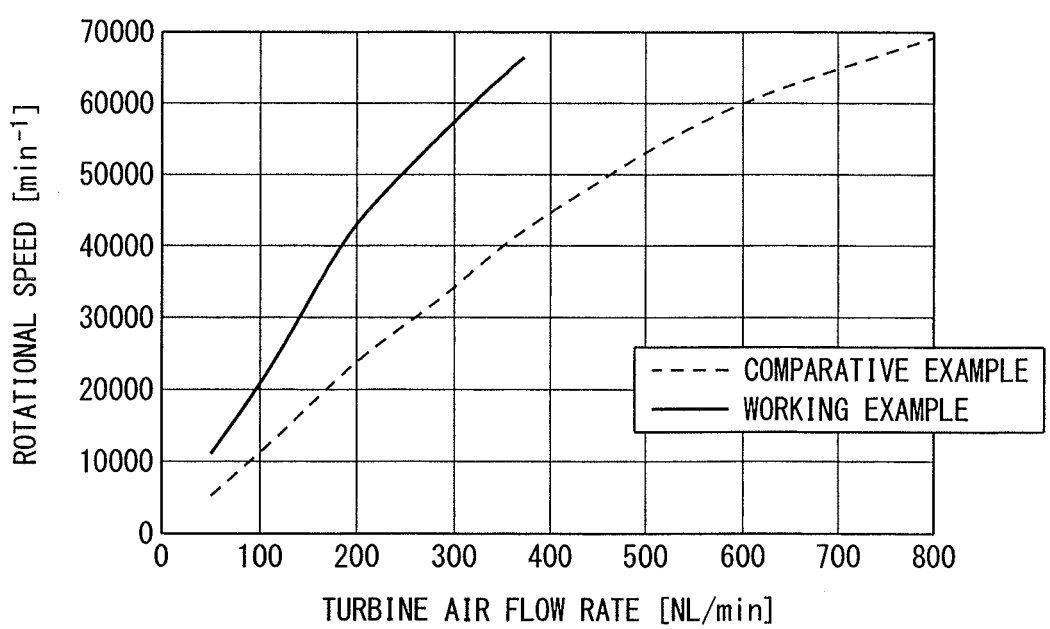
FIG. 5 is a graph which shows a relationship between a flow rate of turbine air and a rotational speed of a rotary shaft of the spindle system.
Figure 6:
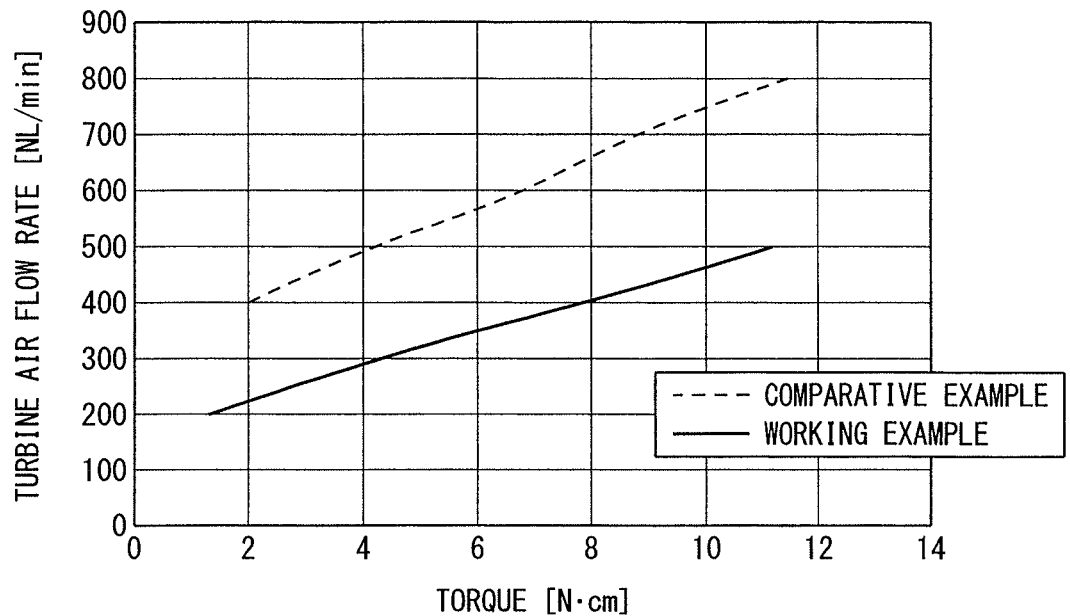
FIG. 6 is a graph which shows a relationship between a flow rate of turbine air and a rotational torque of a rotary shaft of the spindle system.

The results are shown in the graphs of FIGS. 5 and 6. As will be understood from the graphs, the spindle system of the working example can give the same rotational speed by a 40 to 50% smaller flow rate than the spindle system of the comparative example. Further, it could give the same torque by a 30 to 40% smaller flow rate than the spindle system of the comparative example.

Second Embodiment

As explained above, the conventional turbine impeller efficiently converts the impact force of the gas which is ejected to rotational drive force of the turbine impeller, but it has been desired to further convert the kinetic energy of gas to rotational drive force with a high efficiency.

Further, as explained above, in the past, if the turbine impeller rotates at a high speed, the action of the centrifugal force is liable to cause deformation or damage at the turbine blades, so preventing this has been sought.

Therefore, the second embodiment has as its object to solve the above problem of the prior art and provide a spindle system and an electrostatic painting system which convert kinetic energy of gas at a high efficiency to rotational drive force and are resistant to deformation and damage even if rotated at a high speed.

Figure 8:
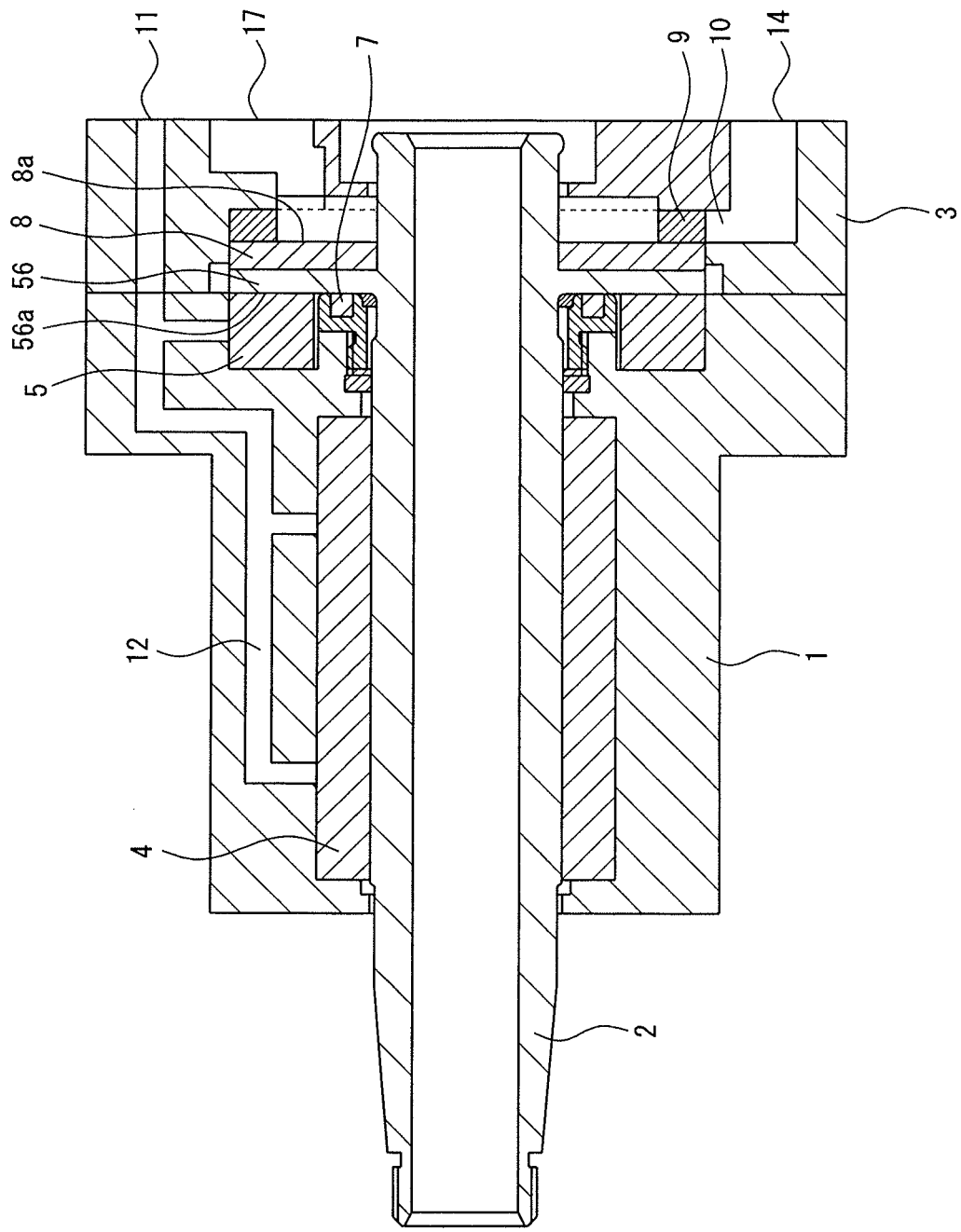
FIG. 8 is a cross-sectional view which shows the structure of a second embodiment of a spindle system according to the present invention.
Figure 9:
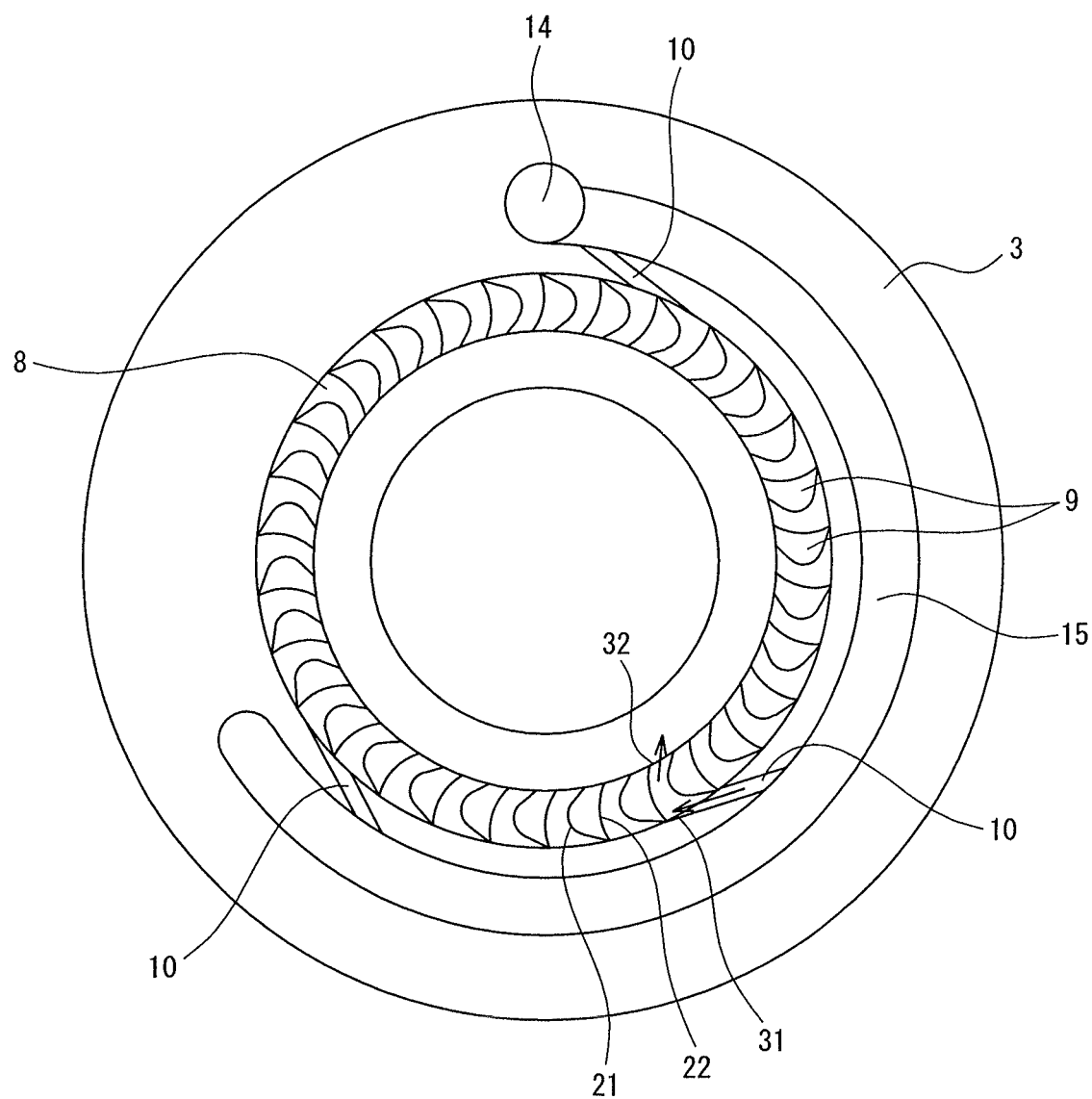
FIG. 9 is a view which shows the structure of a turbine impeller and its peripheral parts of the spindle system of FIG. 8.
Figure 10:
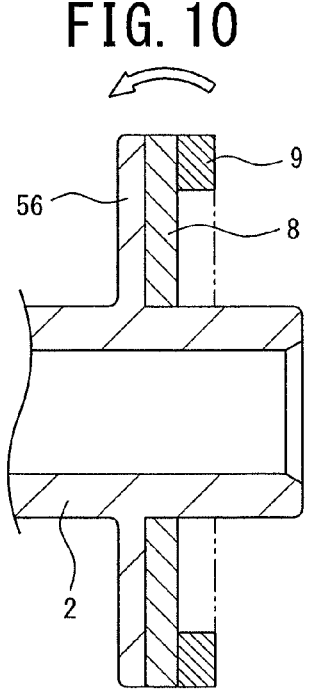
FIG. 10 is a view which explains the structure of a flange part, turbine impeller, and their peripheral parts of the spindle system of FIG. 8.

FIG. 8 is a cross-sectional view which shows the structure of a second embodiment of a spindle system according to the present invention (cross-sectional view along plane including axis of rotary shaft). Further, FIG. 9 is a view which explains the structure of a turbine impeller and its peripheral parts of the spindle system of FIG. 8. Furthermore, FIG. 3 is a perspective view which shows enlarged turbine blades and a nozzle. Furthermore, FIG. 4 is a front view which shows enlarged the turbine blades of a turbine impeller. Furthermore, FIG. 10 is a view which explains the structure of a flange part of a spindle system, turbine impeller, and their peripheral parts of FIG. 8.

Note that, the spindle system of the second embodiment and the spindle system of the first embodiment have similar parts in their constitutions, so the spindle system of the second embodiment will be explained while referring to FIGS. 3 and 4 of the spindle system of the first embodiment together with FIGS. 8, 9, and 10. Further, in FIGS. 8, 9, and 10, parts the same or corresponding to those in FIGS. 1, 2, 3, and 4 are assigned the same reference notations as in FIGS. 1, 2, 3, and 4.

The spindle system of the second embodiment is a spindle system of an air turbine drive type which can be suitably used for an electrostatic painting system, dental use handpiece, etc. and is provided with a substantially tubular housing 1, a substantially tubular gas feed part 3 which is coaxially connected with this housing 1, a rotary shaft 2 which is inserted in the housing 1 and the gas feed part 3, a substantially disk-shaped turbine impeller 8 which is attached concentrically to the rotary shaft 2 and rotates integrally with the rotary shaft 2, and a flange part 56 which supports the turbine impeller 8 and suppresses deformation of the turbine impeller 8 in the axial direction (corresponding to constituent requirement of present invention of deformation suppression part).

Further, this rotary shaft 2 is supported by a radial bearing and axial bearing which are provided at the housing 1 inside the housing 1 and the gas feed part 3 in a rotatable manner. In FIG. 8, the rotary shaft 2 is hollow in shape, but a solid shaft may also be used.

Note that, when using the spindle system of second embodiment, for example, for an electrostatic painting system application, a bell cup painting applicator for scattering and atomizing paint is attached to the rotary shaft 2 in a rotatable manner integrally with it, but in the second embodiment, the end at the side to which the bell cup is attached (in FIG. 8, the left side) at the two ends of the rotary shaft 2 is referred to as the "front end", while the end at the opposite side (in FIG. 8, the right side) is referred to as the "rear end".

Here, a radial bearing will be explained. At the inner circumferential surface of the housing 1, a cylindrical porous member 4 is attached. The inner circumferential surface of this porous member 4 faces the outer circumferential surface of the rotary shaft 2. Further, a bearing-use gas feed path 12 which connects the bearing-use gas feed port 11 which opens to the outside surface of the gas feed part 3 which is attached to the rear end of the housing 1 and the porous member 4 is formed inside of the housing 1 and the gas feed part 3.

Further, the gas (for example, air) which is introduced through the bearing-use gas feed path 12 is blown from the inner circumferential surface of the porous member 4 to the outer circumferential surface of the rotary shaft 2 whereby a gas bearing is formed. The movement of the rotary shaft 2 in the radial direction is restricted by this gas bearing, so the rotary shaft 2 is supported in a rotatable manner without the outer circumferential surface contacting the inner circumferential surface of the porous member 4.

Next, an axial bearing will be explained. The rotary shaft 2 has a flange part 56 which projects out in a direction forming a right angle with the axial direction at a part near the rear end. Further, this flange part 56 is arranged between the rear end side end face of the housing 1 and the gas feed part 3. The flange part 56 has a flat surface which forms a right angle with the axial direction and, for example, may be a disk part which projects out from the outer circumferential surface of the rotary shaft 2 or may be a cylindrical part which is larger in diameter than the rotary shaft 2 (FIG. 8 shows the case of the disk part).

At the rear end side end face of the housing 1, a magnet 7 (permanent magnet or electromagnet) is attached to face the flat surface 56a of the flange part 56. Further, due to this magnet 7, magnetic force acts on the flat surface 56a of the flange part 56 and the flange part 56 is attracted to the housing (front end side in axial direction).

Further, at the rear end side end face of the housing 1, a porous member 5 is attached so as to face the flat surface 56a of the flange part 56. Further, the gas (for example, air) which is introduced through the bearing-use gas feed path 12 is blown from the porous member 5 on the flat surface 56a of the flange part 56. Accordingly, a reaction force acts on the flange part 56, and the flange part 56 is pressed to the rear end side in the axial direction.

Further, due to the reaction force which is generated due to gas being blown from the porous member 5 to the flat surface 56a of the flange part 56 and the magnetic force (attraction force) which is generated by the magnet 7 and balances with the reaction force, a composite bearing is formed. Movement of the rotary shaft 2 in the axial direction is restricted by this composite bearing. Accordingly, the rotary shaft 2 is supported in a rotatable manner without the flat surface 56a of the flange part 56 contacting the rear end side end face of the porous member 5. In this way, according to the radial bearing and axial bearing, the rotary shaft 2 is supported in the housing 1 in a rotatable manner without contacting the housing 1 and the gas feed part 3.

Furthermore, at the rear end side of the flange part 56, a turbine impeller 8 is arranged adjoining the flange part 56. That is, the turbine impeller 8 is a disk shaped member which is separate from the rotary shaft 2, a through hole is formed at its center, and the turbine impeller 8 is attached to the rotary shaft 2 which is inserted through the through hole. Further, among the two plate surfaces of the turbine impeller 8, at the opposite side to the plate surface at the side which faces the flange part 56, that is, at the plate surface 8a (that is, at the plate surface 8a at the rear end side), a plurality of turbine blades 9 are provided.

Here, the structure of the turbine blades 9 and the peripheral parts will be explained in further detail while referring to FIGS. 3, 8, and 9. At the outward part in the diametrical direction of the plate surface 8a of the substantially disk-shaped turbine impeller 8, the plurality of turbine blades 9 are arranged in a ring along the outer circumference of the turbine impeller 8, and the intervals between adjoining turbine blades 9 are equal intervals (corresponding to constituent requirement of present invention of condition A).

Note that, in the second embodiment, the turbine blades 9 are formed so as to project out from the plate surface 8a to the rear end side in the axial direction, but so long as they are arranged in a ring shape along the outer circumference of the turbine impeller 8 and are suitably blown with gas, a cylindrical part may be provided so as to project out from the part of the turbine impeller 8 outward in the diametrical direction to the rear end side in the axial direction and the turbine blades may be provided so as to project out from the inner circumferential surface of this cylindrical part inward in the diametrical direction.

On the other hand, at the part of the inner circumferential surface of the gas feed part 3 which faces the turbine blades 9, nozzles 10 which eject gas for making the turbine impeller 8 rotate are provided. The nozzles 10 are oriented in a direction along the tangential direction of the rotational path of the turbine blades 9 and eject the gas in the same direction. The number of the nozzles 10 is not particularly limited. One or more (in example of FIG. 9, three) are possible.

Further, inside the gas feed part 3, a turbine-use gas feed path 15 which connects the turbine-use gas feed port 14 which opens at the outer surface of the gas feed part 3 and the nozzles 10 is formed continuously in the circumferential direction. Accordingly, the gas which is supplied from the turbine-use gas feed port 14 passes through the turbine-use gas feed path 15 to reach the nozzles 10, is ejected from the nozzles 10, and is sprayed from the outward side in the diametrical direction on the turbine blades 9. The turbine-use gas feed path 15 is a gas feed path of a separate system from the bearing-use gas feed path 12, so the gas feed pressure to the bearings can be maintained constant while accurately controlling the gas feed pressure and flow rate of the gas which is supplied to the turbine impeller 8. As a result, the rotational speed of the rotary shaft 2 can be accurately controlled.

Next, the shape of the turbine blades 9 which receive the gas which is ejected from the nozzles 10 will be explained in further detail while mainly referring to FIG. 4.

The turbine blades 9 are provided so as to project out from the plate surface 8a of the turbine impeller 8 to the rear end side in the axial direction. The amount of projection is a magnitude substantially the same as the opening size of the nozzles 10. Due to this, the gas which is ejected from the nozzles 10 can be received efficiently at the turbine blades 9.

Further, the turbine blades 9 are all the same in shape. Each is provided with a front surface 21 which is oriented to the front in the rotational direction of the turbine impeller 8 and a rear surface 22 which is oriented to the rear in the rotational direction of the turbine impeller 8 and which receives gas (corresponding to constituent requirement of present invention of condition B). This rear surface 22 is a recessed columnar surface which has a radius of curvature R1. The recessed columnar surface is formed so that the axis of the recessed columnar surface becomes the same direction as the projecting direction of the turbine blades 9.

On the other hand, the front surface 21 is a smooth continuous surface comprised of a projecting columnar surface 21b having a radius of curvature R3 smaller than R1, arranged between a projecting columnar surface 21a having a radius of curvature R2 larger than R1 and a flat surface 21c (corresponding to constituent requirement of present invention of condition C). At this time, regarding the arrangement of the three surfaces 21a, 21b, and 21c which form the front surface 21, straddling the projecting columnar surface 21b which has a radius of curvature R3, the projecting columnar surface 21a which has a radius of curvature R2 is arranged at the outward side in the diametrical direction and the flat surface 21c is arranged at the inward side in the diametrical direction (corresponding to constituent requirement of present invention of condition E). Further, in the same way as the rear surface 22, the two projecting columnar surfaces 21a, 21b are formed so that the axes of the two projecting columnar surfaces 21a, 21b all become the same direction as the projecting direction of the turbine blades 9 and the flat surface 21c is formed parallel to the projecting direction of the turbine blades 9.

In a space which is sandwiched between the facing front surface 21 and rear surface 22 of two adjoining turbine blades 9, 9, gas is blown from a nozzle 10. The space forms part of a channel of the gas. That is, gas which is ejected from a nozzle 10, as shown in FIG. 9 by the arrows, flows in from an opening 31 at the outward side end in the diametrical direction of the space (below, this opening 31 sometimes being referred to as "inlet 31") and strikes the rear surface 22. Accordingly, the radius of curvature R2 of the projecting columnar surface 21a is preferably a magnitude which does not obstruct the gas which is ejected from the nozzle 10 flowing into the inlet 31. That is, the surface is preferably a columnar one with a small degree of curvature close to a flat surface in shape.

Further, the gas flows in a direction along the arc-shaped curve of the recessed columnar surface which forms the rear surface 22 and, as shown in FIG. 9 by the arrows, flows out from the opening 32 at the end of the space at the inward side in the radial direction (below, this opening 32 sometimes being referred to as the "outlet 32") (corresponding to constituent requirement of present invention of condition D), then is exhausted from a turbine-use exhaust port 17 which opens to the outside surface of the gas feed part 3 to the outside of the spindle system.

Further, the rear surface 22 preferably satisfies the following condition. That is, the angle between the ejection direction of the gas which is ejected from the nozzles 10 and the inlet-side end in the recessed columnar surface which forms the rear surface 22 of the turbine blades 9 which receive the ejected gas is preferably 75° to 105° (corresponding to constituent requirement of present invention of condition N). According to such a configuration, the impact force of the gas which is ejected from the nozzles 10 can be converted efficiently to a rotational drive force. To convert the impact force of the gas which is ejected from the nozzles 10 to the rotational drive force by the highest efficiency, the angle between the ejection direction of the gas which is ejected from the nozzles 10 and the inlet-side end in the recessed columnar surface which forms the rear surface 22 of the turbine blades 9 which receive the ejected gas is most preferably 90°.

Furthermore, the rear surface 22 which is provided at each turbine blade 9 preferably satisfies the following condition. That is, the angle θ which is formed between the tangent plane 41 at the outlet-side end of the rear surface 22 and the tangent plane 43 at the outlet-side end of the rotational path at the outlet-side end of this rear surface 22 is preferably 20° to 50° (corresponding to constituent requirement of present invention of condition K), particularly preferably is 40°.

Furthermore, the flat surface 21c of the front surface 21 preferably satisfies the following condition. That is, the flat surface 21c of the front surface 21 faces the rear surface 22 of the adjoining turbine blade 9, but is preferably parallel with the tangent plane 42 at the outlet-side end of the rear surface 22 which faces this and the flat surface 21c (corresponding to constituent requirement of present invention of condition L).

Furthermore, when defining a distance between the furthest part from the inlet 31 of the channel in the projecting columnar surface 21a which has a radius of curvature R2 and the inlet-side end in the rear surface 22 of the adjoining turbine blade 9 which faces the projecting columnar surface 21a as "A" and defining a distance between the flat surface 21c of the front surface 21 and the tangent plane 42 at the outlet-side end of the rear surface 22 of the adjoining turbine blade 9 which faces this flat surface 21c as "B" (that is, the length between the two flat surfaces 21c, 42 of the straight line which perpendicularly intersects the parallel flat surface 21c and tangent plane 42 is "B"), the distance B is preferably less than the distance A (corresponding to constituent requirement of present invention of condition M). That is, the width of the outlet 32 of the channel is preferably less than the width of the inlet 31.

Since these conditions K, L, and M are satisfied, the gas which flows in from the inlet 31 to the inside of the channel falls in flow rate once due to striking the rear surface 22, but then is raised in flow rate when passing through the part between the flat surface 21c of the front surface 21 and the rear surface 22. A reaction force occurs right before the gas which is raised in flow rate flows out from the outlet 32 to the outside of the channel and the reaction force is received by the rear surface 22, so the reaction force is converted to rotational drive force together with the impact force of the gas which is ejected from the nozzles 10. Accordingly, compared with a general air turbine drive type spindle system which utilizes only the impact force, it is possible to convert the kinetic energy of the gas to rotational drive force by an extremely high efficiency. As a result, even if using a relatively low flow rate gas, high speed rotation and high torque of the spindle system can be achieved.

Further, in the arts which are disclosed in Patent Documents 1 and 2, the cross-sectional area of a gas channel (the cross-sectional area of the plane which perpendicularly intersects the flow direction of the gas which flows through the inside of the channel) is large, so when fabricating the turbine blades by cutting, the amount of machining becomes large and the machining cost becomes higher, but with the art of the present embodiment, the cross-sectional area of a gas channel is small, so the amount of machining when fabricating the turbine blades 9 by cutting is small and the machining cost is low.

On the other hand, if the spindle system rotates at a high speed, the centrifugal force which occurs due to rotation becomes larger. This being so, centrifugal force which is directed outward in the diametrical direction acts at the rotating turbine impeller 8 and turbine blades 9 are formed at one plate surface 8a in the axial direction of the turbine impeller 8 (in the second embodiment, plate surface at rear end side in the axial direction), so a moment directed to the other side in the axial direction acts on the turbine impeller 8 (in the second embodiment, moment facing rear end side in moment axial direction, moment in arrow direction of FIG. 10). As a result, the turbine impeller 8 easily deforms in the axial direction.

However, the spindle system of the second embodiment is provided with a flange part 56, which supports the turbine impeller 8 and suppresses deformation in the turbine impeller 8 in the axial direction, at the rotary shaft 2. Explained in detail, the flange part 56 is provided adjoining the plate surface at which the turbine blades 9 are not formed among the two plate surfaces of the turbine impeller 8.

Accordingly, even if moment directed to the front end side in the axial direction is applied to the turbine impeller 8, the flange part 56 which is arranged at the front end side of the turbine impeller 8 in the axial direction supports the turbine impeller 8 and suppresses deformation of the turbine impeller 8 in the axial direction, so even if the spindle system is used in a high speed rotation condition, deformation of the turbine impeller 8 in the axial direction is prevented. Further, even if the magnitude of the moment which is applied to the turbine impeller 8 becomes more than strength of the material forming the turbine impeller 8, since the flange part 56 supports the turbine impeller 8 and suppresses deformation of the turbine impeller 8 in the axial direction, there is little chance of the turbine impeller 8 being damaged.

Note that, in the second embodiment, the flange part 56 which is formed integrally with the rotary shaft 2 was the deformation suppression part, but there is no problem even if a member separate from the rotary shaft 2 is the deformation suppression part. For example, it is also possible to insert and fasten rotary shaft 2 in a through hole which is formed at the center of a substantially disk-shaped member so as to form the deformation suppression part.

Further, the material which forms the deformation suppression part is preferably higher in tensile strength than the material which forms the turbine impeller 8. That is, when the deformation suppression part is the flange part 56 which is formed integrally with the rotary shaft 2, the material which forms the rotary shaft 2 is preferably higher in tensile strength than the material which forms the turbine impeller 8. Further, when the deformation suppression part is a member separate from the rotary shaft 2, the material which forms the separate member is preferably higher in tensile strength than the material which forms the turbine impeller 8. According to such a configuration, deformation of the turbine impeller 8 in the axial direction is more easily suppressed by the deformation suppression part.

Furthermore, a turbine impeller 8 which has a plurality of shapes of turbine blades 9 is difficult to work, but if the material which forms the turbine impeller 8 is lower in tensile strength than the material which forms the rotary shaft 2, the machine ability is improved. For this reason, the cutting tool is more resistant to wear, the machining time is shortened, and other merits arise which lead to a reduction of cost.

Furthermore, as the performances which are sought from the spindle system, high speed rotation, high acceleration, and high deceleration are the mainstream, but to realize high acceleration and high deceleration, lightening the weight of the rotary shaft 2 is important. Therefore, it is preferable to make the turbine impeller 8 and the rotary shaft 2 separate members and make the material which forms the turbine impeller 8 a lower specific gravity than the material which forms the rotary shaft 2. By doing this, the turbine impeller 8 can be lightened in weight, so it is possible to reduce the inner shear of the integrally rotating rotary shaft 2 and turbine impeller 8 as a whole and it is possible shorten the acceleration time or deceleration time (that is, it is possible to realize high acceleration and high deceleration).

Next, the operation of this spindle system will be explained. If supplying gas made of compressed air etc. to the bearing-use gas feed port 11 which opens at the outer surface of the gas feed part 3 which is attached to the rear end part of the housing 1, this gas passes through the bearing-use gas feed path 12 and reaches the outer circumferential surface side of the porous member 4. Further, the gas passes through the porous member 4 and is ejected from the inner circumferential surface of the porous member 4, is blown on to the outer circumferential surface of the rotary shaft 2, is ejected from the rear end side face of the porous member 5, and is blown on the flat surface 56a of the flange part 56.

Due to this, the outer circumferential surface of the rotary shaft 2 and the inner circumferential surface of the porous member 4 enter a noncontact state and the rotary shaft 2 is supported in a floating manner. Furthermore, the reaction force which acts on the flat surface 56a of the flange part 56 causes the rotary shaft 2 to move to the rear end side in the axial direction whereby the flat surface 56a of the flange part 56 and the rear end side end face of the porous member 5 enter a noncontact state. Further, at the position where the magnetic force (attraction force) which is generated by the magnet 7 and its reaction force balance, the rotary shaft 2 is supported in a floating manner.

If supplying gas by compressed air etc. to a turbine-use gas feed path 15 which is formed inside the gas feed part 3 simultaneously with or delayed from the supply of gas to such a gas bearing, the gas which flows through the turbine-use gas feed path 15 reaches the nozzles 10. Gas is blown on the turbine blades 9 of the turbine impeller 8 which is provided concentrically with the rear end side end of the rotary shaft 2, so the rotary shaft 2 is driven to rotate at a high speed together with the turbine impeller 8. At this time, along with the impact force of the gas which is blown against the turbine blades 9 and the reaction force which is generated right before the gas flows out to the outside of the turbine impeller 8 is also converted to rotational drive force, so the kinetic energy of the gas is converted to rotational drive force at an extremely high efficiency.

Such a spindle system of the second embodiment can be applied to an electrostatic painting system. The electrostatic painting system is provided with a spindle system, a bell cup paint applicator (not shown) for scattering and atomizing paint, feed pipes (not shown) for feeding, for example, paint and thinner to the bell cup, and a high voltage generator (not shown) which applies a charge to the paint. A paint feed pipe and thinner feed pipe are inserted through the inside of the hollow rotary shaft 2, while the bell cup is attached to a front end of the rotary shaft 2 in a rotatable manner integrally with it.

A high voltage generator is used to place the inside of the rotary shaft 2 in a high voltage electrostatic field while the gas is blown against the turbine blades 9 of the turbine impeller 8 and makes the rotary shaft 2 rotate at a high speed. In that state, paint and thinner are supplied to the bell cup through the paint feed pipe and thinner feed pipe which pass through the inside of the rotary shaft 2. This being so, electrostatically atomized paint is sprayed from the bell cup which rotates at a high speed at the front end of the rotary shaft 2 on to the painted object. Due to this, the painted object can be painted. If changing the size, shape, etc. of the bell cup, various painted objects can be painted.

Note that, the second embodiment shows one example of the present invention. The present invention is not limited to the second embodiment. For example, if there is no damage due to centrifugal force and damage due to repeated stress, the material of the turbine blades 9 is not particularly limited. Accordingly, if using a small density material to form the turbine blades 9, the time from the start of rotation to when a predetermined rotational speed is reached becomes short, so, for example, when applying the spindle system to an electrostatic painting system, the time for painting work can be shortened.

Further, the type of the gas which is blown on the turbine blades 9 of the turbine impeller 8 is not particularly limited. In addition to compressed air or other air, nitrogen, water vapor, or other type of gas can be used.

That is, if arranging porous members at the two sides straddling the flange part 56 and turbine impeller 8 and blowing gas to the flat surface 56a of the flange part 56 and the plate surface 8a of the turbine impeller 8 to form a gas bearing, movement of the rotary shaft 2 in the axial direction is restricted by this gas bearing, so the flat surface 56a of the flange part 56 and the plate surface 8a of the turbine impeller 8 are supported in a rotatable manner without contacting the two porous members.

Furthermore, in the second embodiment, the radial bearing is a gas bearing and this gas bearing is used to support the rotary shaft 2 at the housing 1 in a rotatable manner, but instead of a gas bearing, a roller bearing (for example, angular ball bearing suitable for high speed rotation) may also be used. That is, if arranging a roller bearing between the inner circumferential surface of the housing 1 and the rotary shaft 2, this roller bearing may be used to support the rotary shaft 2 at the housing 1 in a rotatable manner.

Third Embodiment

As explained above, the conventional turbine impeller converts the impact force of the gas which is ejected efficiently to rotational drive force of the turbine impeller, but preferably converts the kinetic energy of the gas to a rotational drive force with a further higher efficiency.

Further, as explained above, in the past, if the turbine impeller rotates at a high speed, the action of the centrifugal force is liable to cause deformation or damage at the turbine blades, so preventing this has been sought.

Therefore, the third embodiment has as its object to solve the above problem of the prior art and provide a spindle system which converts kinetic energy of gas at a high efficiency to rotational drive force and is resistant to deformation and damage even if rotated at a high speed and an electrostatic painting system.

Figure 11:
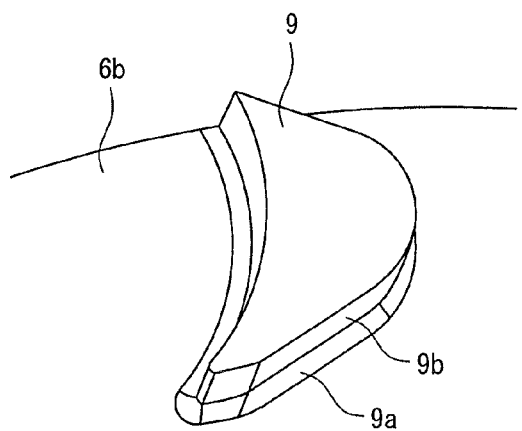
FIG. 11 is a view which explains the structure of a third embodiment of a spindle system according to the present invention and a perspective view of a turbine blade which shows a boundary part of a turbine impeller.
Figure 12:
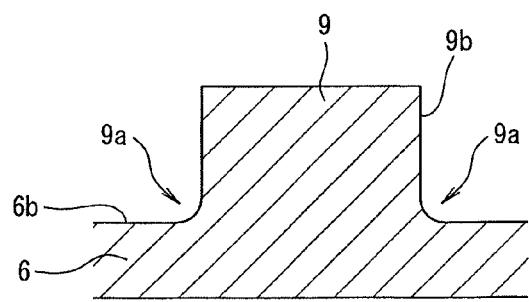
FIG. 12 is a cross-sectional view of a turbine blade of a spindle system of the third embodiment.

FIG. 1 is a cross-sectional view which shows the structure of a third embodiment of a spindle system according to the present invention (cross-sectional view cut at plane including axis of rotary shaft). Further, FIG. 2 is a view which explains the structure of the turbine impeller and its peripheral parts of the spindle system of FIG. 1. Furthermore, FIG. 3 is a perspective view which shows enlarged a turbine blade and nozzle. Furthermore, FIG. 4 is a front view which shows enlarged turbine blades of the turbine impeller. Furthermore, FIG. 11 is a perspective view of a turbine blade which shows the shape of a boundary part with the turbine impeller. Furthermore, FIG. 12 is a cross-sectional view of a turbine blade which explains the shape of a boundary part with the turbine impeller and a cross-sectional view along I-I of FIG. 4.

Note that, the spindle system of the third embodiment and the spindle system of the first embodiment have similar parts in their constitutions, so the spindle system of the third embodiment will be explained while referring to FIGS. 1, 2, 3, and 4 of the spindle system of the first embodiment together with FIGS. 11 and 12. Further, in FIGS. 11 and 12, parts the same or corresponding to those in FIGS. 1, 2, 3, and 4 are assigned the same reference notations as in FIGS. 1, 2, 3, and 4.

The spindle system of the third embodiment is a spindle system of an air turbine drive type which can be suitably used for an electrostatic painting system, dental use handpiece, etc. which is provided with a substantially tubular housing 1, a substantially tubular gas feed part which is coaxially connected to this housing 1, and a rotary shaft 2 which is inserted through the housing 1 and the gas feed part 3. Further, this rotary shaft 2 is supported by the radial bearing and axial bearing which are provided at the housing 1 in a rotatable manner at the inside of the housing 1 and the gas feed part 3. In FIG. 1, the rotary shaft 2 is hollow in shape, but a solid shaft may also be used.

Note that, when using the spindle system of the third embodiment, for example, for an electrostatic painting system application, a bell cup painting applicator for scattering and atomizing paint is attached to the rotary shaft 2 in a rotatable manner integrally with it, but in the third embodiment, the end at the side to which the bell cup is attached (in FIG. 1, the left side) at the two ends of the rotary shaft 2 is referred to as the "front end", while the end at the opposite side (in FIG. 1, the right side) is referred to as the "rear end".

Here, a radial bearing will be explained. At the inner circumferential surface of the housing 1, a cylindrical porous member 4 is attached. The inner circumferential surface of this porous member 4 faces the outer circumferential surface of the rotary shaft 2. Further, a bearing-use gas feed path 12 which connects the bearing-use gas feed port 11 which opens to the outside surface of the gas feed part 3 which is attached to the rear end of the housing 1 and the porous member 4 is formed inside of the housing 1 and the gas feed part 3.

Further, by spraying the gas which was introduced through the bearing-use gas feed path 12 (for example, air) from the inner circumferential surface of the porous member 4 to the outer circumferential surface of the rotary shaft 2, a gas bearing is formed. The movement of the rotary shaft 2 in the radial direction is restricted by this gas bearing, so the rotary shaft 2 is supported in a rotatable manner without the outer circumferential surface contacting the inner circumferential surface of the porous member 4.

Next, an axial bearing will be explained. The rotary shaft 2 has a flange part 6, at the part near the rear end, which projects out in a direction forming a right angle with its axial direction. This flange part 6 is arranged between the rear end side end face of the housing 1 and the gas feed part 3. The flange part 6 need only have a flat surface with forms a right angle with the axial direction. For example, it may be a disk part which projects out from the outer circumferential surface of the rotary shaft 2 and may be a cylindrical part of a larger diameter than the rotary shaft 2 (FIG. 1 shows the case of a disk part).

At the rear end side end face of the housing 1, a magnet 7 (permanent magnet or electromagnet) is attached so as to face the flat surface 6a of the flange part 6. Further, this magnet 7 causes a magnetic force to act on the flat surface 6a of the flange part 6 and causes the flange part 6 to be pulled to the housing 1 (front end side in axial direction).

Further, at the rear end side end face of the housing 1, a porous member 5 is attached so as to face the flat surface 6a of the flange part 6. Further, gas (for example, air) which is introduced through the bearing-use gas feed path 12 is blown from the porous member 5 to the flat surface 6a of the flange part 6. Accordingly, a reaction force acts at the flange part 6, and the flange part 6 is pressed against the rear end side in the axial direction.

Further, due to the reaction force which is generated due to gas being blown from the porous member 5 to the flat surface 6a of the flange part 6 and the magnetic force (attraction force) which is generated by the magnet 7 and balances with the reaction force, a composite bearing is formed. Movement of the rotary shaft 2 in the axial direction is restricted by this composite bearing. Accordingly, the rotary shaft 2 is supported in a rotatable manner without the flat surface 6a of the flange part 6 contacting the rear end side end face of the porous member 5.

In this way, due to the radial bearing and axial bearing, the rotary shaft 2 is supported at the housing 1 in a rotatable manner without contacting the housing 1 and the gas feed part 3. Note that, in the third embodiment, the axial bearing was a composite bearing using gas and a magnet, but it may also be a gas bearing. That is, if arranging porous members at the two sides straddling the flange part 6 and blowing gas to the two flat surfaces 6a, 6b of the flange part 6 to form a gas bearing, movement of the rotary shaft 2 in the axial direction is restricted by this gas bearing, so the two flat surfaces 6a, 6b of the flange part 6 are supported in a rotatable manner without contacting the two porous members.

Further, in the third embodiment, the radial bearing is a gas bearing, and this gas bearing is used to support the rotary shaft 2 at the housing 1 in a rotatable manner, but instead of the gas bearing, a roller bearing (for example, an angular ball bearing suitable for high speed rotation) may also be used. That is, if arranging a roller bearing between the inner circumferential surface of the housing 1 and the rotary shaft 2, this roller bearing may be used to support the rotary shaft 2 at the housing 1 in a rotatable manner.

Furthermore, among the two flat surfaces 6a, 6b of the flange part 6, at the opposite side to the flat surface 6a at the side which faces the porous member 5, that is, at the flat surface 6b (that is, the flat surface 6b at the rear end side), a plurality of turbine blades 9 are provided. That is, the flange part 6 forms part of the turbine impeller of the turbine.

Here, the structure of the turbine blades 9 and the peripheral parts will be explained in further detail while referring to FIGS. 1, 2, and 3. At the part of the flat surface 6b of the disk shaped flange part 6 outward in the diametrical direction, the plurality of turbine blades 9 are arranged in a ring along the outer circumference of the flange part 6, and the intervals between adjoining turbine blades 9 are equal intervals (corresponding to constituent requirement of present invention of condition A).

Note that, in the third embodiment, the turbine blades 9 are provided so as to project out from the flat surface 6b to the rear end side in the axial direction, but if arranged in a ring along the outer circumference of the flange part 6 and if the gas is suitably blown on them, they may also be provided so as to project out from the outer circumferential surface of the flange part 6 outward in the diametrical direction. Alternatively, it is also possible to provide the cylindrical part so as to project out from the part of the flange part 6 outward in the diametrical direction to the rear end side in the axial direction and possible to provide the turbine blades so as to project out from the inner circumferential surface of this cylindrical part inward in the diametrical direction.

On the other hand, at the part of the inner circumferential surface of the gas feed part 3 which face the turbine blades 9, nozzles 10 which eject gas for making the turbine impeller 6 rotate are provided. The nozzles 10 are oriented in a direction along the tangential direction of the rotational path of the turbine blades 9 and eject gas in the same direction. The number of nozzles 10 is not particularly limited. One or more (in example of FIG. 2, three) is possible.

Further, inside the gas feed part 3, a turbine-use gas feed path 15 which connects the turbine-use gas feed port 14 which opens at the outer surface of the gas feed part 3 and the nozzles 10 is formed continuously in the circumferential direction. Accordingly, the gas which is supplied from the turbine-use gas feed port 14 passes through a turbine-use gas feed path 15 to reach the nozzles 10, is ejected from the nozzles 10, and is blown from the outward side in the diametrical direction to the turbine blades 9. The turbine-use gas feed path 15 forms a gas feed path of a separate system from the bearing-use gas feed path 12, so the gas feed pressure to the bearings can be maintained constant while accurately controlling the gas feed pressure and flow rate of the gas which is supplied to the turbine impeller 6. As a result, the rotational speed of the rotary shaft 2 cannot be accurately controlled.

Next, the shape of the turbine blades 9 which receive the gas which is ejected from the nozzles 10 will be explained in further detail while mainly referring to FIG. 4.

The turbine blades 9 are provided so as to project out from the flat surface 6b of the flange part 6 to the rear end side in the axial direction. This amount of projection (projecting length from flat surface 6b) is a magnitude substantially the same as the opening diameter of the nozzle 10 at the major parts of the turbine blades 9 other than the boundary parts 9a with the turbine impeller 6. Due to this, the gas which is ejected from the nozzle 10 can be efficiently received by the turbine blades 9.

Further, the turbine blades 9 are all the same shape. Each is provided with a front surface 21 which is oriented toward the front in the rotational direction of the turbine impeller 6 and a rear surface 22 which is oriented toward the rear in the rotational direction of the turbine impeller 6 (corresponding to constituent requirement of present invention of condition B). This rear surface 22 is a recessed columnar surface which has a radius of curvature R1. The recessed columnar surface is formed so that axis of the recessed columnar surface becomes the same direction as the projecting direction of the turbine blade 9.

On the other hand, the front surface 21 is a smooth continuous surface comprised of a projecting columnar surface 21a which has a radius of curvature R2 larger than R1 and a flat surface 21c between which a projecting columnar surface 21b which has a radius of curvature R3 larger than R1 is arranged and overall forms a curved substantially projecting surface (corresponding to constituent requirement of present invention of condition C). At this time, regarding the arrangement of the three surfaces 21a, 21b, and 21c which form the front surface 21, straddling the projecting columnar surface 21b which has the radius of curvature R3, the projecting columnar surface 21a which has a radius of curvature R2 is arranged at the outward side in the diametrical direction and the flat surface 21c is arranged at the inward side in the diametrical direction (corresponding to constituent requirement of present invention of condition E). Further, in the same way as the rear surface 22, the two projecting columnar surfaces 21a, 21b are formed so that the axes of the two projecting columnar surfaces 21a, 21b all become the same direction as the projecting direction of the turbine blades 9 and the flat surface 21c is formed parallel to the projecting direction of the turbine blades 9.

In a space which is sandwiched between the facing front surface 21 and rear surface 22 of two adjoining turbine blades 9, 9, gas is blown from a nozzle 10. The space forms part of a channel of the gas. That is, gas which is ejected from a nozzle 10, as shown in FIG. 2 by the arrows, flows in from an opening 31 at the outward side end in the diametrical direction of the space (below, this opening 31 sometimes being referred to as "inlet 31") and strikes the rear surface 22. Accordingly, the radius of curvature R2 of the projecting columnar surface 21a is preferably a magnitude which does not obstruct the gas which is ejected from the nozzle 10 flowing into the inlet 31. That is, the surface is preferably a columnar one with a small degree of curvature close to a flat surface in shape.

Further, the gas flows in a direction along the arc-shaped curve of the recessed columnar surface which forms the rear surface 22 and, as shown in FIG. 2 by the arrows, flows out from the opening 32 at the end of the space at the inward side in the radial direction (below, this opening 32 sometimes being referred to as the "outlet 32") (corresponding to constituent requirement of present invention of condition D), then is exhausted from turbine-use exhaust port which opens to the outside surface of the gas feed part 3 to the outside of the spindle system.

Further, the rear surface 22 preferably satisfies the following condition. That is, the angle between the ejection direction of the gas which is ejected from the nozzles 10 and the inlet-side end in the recessed columnar surface which forms the rear surface 22 of the turbine blades 9 which receive the ejected gas is preferably 75° to 105° (corresponding to constituent requirement of present invention of condition N). According to such a configuration, the impact force of the gas which is ejected from the nozzles 10 can be converted efficiently to a rotational drive force. To convert the impact force of the gas which is ejected from the nozzles 10 to the rotational drive force by the highest efficiency, the angle between the ejection direction of the gas which is ejected from the nozzles 10 and the inlet-side end in the recessed columnar surface which forms the rear surface 22 of the turbine blades 9 which receive the ejected gas is most preferably 90°.

Furthermore, the rear surface 22 which is provided at each turbine blade 9 preferably satisfies the following condition. That is, the angle θ which is formed between the tangent plane 41 at the outlet-side end of the rear surface 22 and the tangent plane 43 at the outlet-side end of the rotational path at the outlet-side end of this rear surface 22 is preferably 20° to 50° (corresponding to constituent requirement of present invention of condition K), particularly preferably is 40°.

Furthermore, the flat surface 21c of the front surface 21 preferably satisfies the following condition. That is, the flat surface 21c of the front surface 21 faces the rear surface 22 of the adjoining turbine blade 9, but is preferably parallel with the tangent plane 42 at the outlet-side end of the rear surface 22 which faces this and the flat surface 21c (corresponding to constituent requirement of present invention of condition L).

Furthermore, when defining a distance between the furthest part from the inlet 31 of the channel in the projecting columnar surface 21a which has the radius of curvature R2 and the inlet-side end in the rear surface 22 of the adjoining turbine blade 9 which faces the projecting columnar surface 21a as "A" and defining a distance between the flat surface 21c of the front surface 21 and the tangent plane 42 at the outlet-side end of the rear surface 22 of the adjoining turbine blade 9 which faces this flat surface 21c as "B" (that is, the length between the two flat surfaces 21c, 42 of the straight line which perpendicularly intersects the parallel flat surface 21c and tangent plane 42 is "B"), the distance B is preferably less than the distance A (corresponding to constituent requirement of present invention of condition M). That is, the width of the outlet 32 of the channel is preferably less than the width of the inlet 31.

Since these conditions K, L, and M are satisfied, the gas which flows in from the inlet 31 to the inside of the channel falls in flow rate once due to striking the rear surface 22, but then is raised in flow rate when passing through the part between the flat surface 21c of the front surface 21 and the rear surface 22. A reaction force occurs right before the gas which is raised in flow rate flows out from the outlet 32 to the outside of the channel and the reaction force is received by the rear surface 22, so the reaction force is converted to rotational drive force together with the impact force of the gas which is ejected from the nozzles 10. Accordingly, compared with a general air turbine drive type spindle system which utilizes only the impact force, it is possible to convert the kinetic energy of the gas to rotational drive force by an extremely high efficiency. As a result, even if using a relatively low flow rate gas, high speed rotation and high torque of the spindle system can be achieved.

Further, in the arts which are disclosed in Patent Documents 1 and 2, the cross-sectional area of a gas channel (the cross-sectional area of the plane which perpendicularly intersects the flow direction of the gas which flows through the inside of the channel) is large, so when fabricating the turbine blades by cutting, the amount of machining becomes large and the machining cost becomes higher, but with the art of the present embodiment, the cross-sectional area of a gas channel is small, so the amount of machining when fabricating the turbine blades 9 by cutting is small and the machining cost is low.

On the other hand, if the spindle system rotates at a high speed, a large centrifugal force is generated, so the turbine blades 9 are subjected to stress directed outward in the diametrical direction and stress directed in the axial direction (in the third embodiment, the turbine blades 9 are formed at the flat surface 6b at the rear end side of the turbine impeller 6, so stress directed in the front end side in the axial direction). As a result, the turbine blades 9 easily deform. In particular, since the turbine blades 9 are formed projecting out from the flat surface 6b of the turbine impeller 6, stress easily concentrates at the boundary parts 9a of the turbine blades 9 with the turbine impeller 6.

Even if the flat surface 6b of the turbine impeller 6 and the side surfaces 9b of the turbine blades 9 (surfaces at outer surfaces of turbine blades 9 which follow along projecting directions, for example, the front surfaces 21 and rear surfaces 22) intersect at right angles and the edge parts which are formed by the intersections are angular, stress concentrates at these angular edge parts, so the turbine blades 9 easily deform. Furthermore, if the size of the stress which is repeatedly applied to the turbine blades 9 becomes more than the fatigue limit of the material which forms the turbine blades 9, the turbine blades 9 are liable to be damaged by repeated operation.

However, in the spindle system of the third embodiment, the cross-sectional shape of the side surface of a boundary part 9a cut at the plane along the projecting direction of the turbine blade 9 is a curve so that the boundary part 9a in the turbine blade 9 becomes a shape where the projecting length from the flat surface 6b of the turbine impeller 6 is not constant. That is, the boundary part 9a in the turbine blade 9, as will be understood from FIG. 12, becomes a shape where the projecting length from the flat surface 6b of the turbine impeller 6 becomes gradually longer from the outside end toward the inside of the turbine blade 9. The type of curve is not particularly limited, but an arc is preferable as shown in FIGS. 11 and 12.

Accordingly, the flat surface 6b of the turbine impeller 6 and the side surface 9b of the turbine blade 9 do not intersect at right angles, but are smoothly connected by the boundary part 9*a*. The edge part which is formed by the intersection is rounded. In other words, the edge part which is formed by the intersection is given roundness (as prescribed by Japan Industrial Standard JIS B0701). As a result, concentration of stress to the boundary part 9*a* is eased, so even if the spindle system is used in a high speed rotating condition and a large stress is applied to the turbine blade due to centrifugal force, the turbine blade 9 is kept from being deformed. Due to this, the size of the stress which is repeatedly applied to the turbine blade 9 seldom becomes greater than the fatigue limit of the material which forms the turbine blade 9, so there is almost no chance of the turbine blade 9 being damaged due to repeated operation.

Note that, if considering the workability in the case of fabricating the turbine blade 9 by cutting and the ease of flow of gas inside the channel, the radius of curvature of the arc of the boundary part 9*a* is preferably 0.1 mm to 0.5 mm.

Further, as shown in FIGS. 11 and 12, it is preferable to make all of each boundary part 9*a* (that is, the entire circumference of a turbine blade 9) a shape where the projecting length from the flat surface 6*b* of the turbine impeller 6 is not constant. If doing this, the effect of easing stress concentration is highest, but it is also possible to make just part of the boundary part 9*a* a shape where the projecting length from the flat surface 6*b* of the turbine impeller 6 is not constant.

Furthermore, in the third embodiment, the edge part which was formed by the intersection was rounded, but it may also be chamfered. That is, it is also possible to make the cross-sectional shape of the side surface of the boundary part 9*a* cut at a plane along the projecting direction of the turbine blade 9 a straight line inclined with respect to the flat surface 6*b* of the turbine impeller 6 so that the boundary part 9 in the turbine blade 9 becomes a shape where the projecting length from the flat surface 6*b* of the turbine impeller 6 is not constant. The inclined angle of the straight line of the boundary part 9*a* is preferably 45°, but may also be another angle.

Next, the operation of this spindle system will be explained. If supplying gas made of compressed air etc. to the bearing-use gas feed port 11 which opens at the outer surface of the gas feed part 3 which is attached to the rear end part of the housing 1, this gas passes through the bearing-use gas feed path 12 and reaches the outer circumferential surface side of the porous member 4. Further, the gas passes through the porous member 4 and is ejected from the inner circumferential surface of the porous member 4, is blown on to the outer circumferential surface of the rotary shaft 2, is ejected from the rear end side face of the porous member 5, and is blown on the flat surface 6*a* of the flange part 6.

Due to this, the outer circumferential surface of the rotary shaft 2 and the inner circumferential surface of the porous member 4 enter a noncontact state and the rotary shaft 2 is supported in a floating manner. Furthermore, the reaction force which acts on the flat surface 6*a* of the flange part 6 causes the rotary shaft 2 to move to the rear end side in the axial direction whereby the flat surface 6*a* of the flange part 6 and the rear end side end face of the porous member 5 enter a noncontact state. Further, at the position where the magnetic force (attraction force) which is generated by the magnet 7 and the reaction force balance, the rotary shaft 2 is supported in a floating manner.

If supplying gas by compressed air etc. to the turbine-use gas feed path 15 which is formed inside the gas feed part 3 simultaneously with or delayed from the supply of gas to such a gas bearing, the gas which flows through the turbine-use gas feed path 15 reaches the nozzles 10. Gas is blown on the turbine blades 9 of the turbine impeller 6 which is provided concentrically with the rear end side end of the rotary shaft 2, so the rotary shaft 2 is driven to rotate at a high speed together with the turbine impeller 6. At this time, the impact force of the gas which is blown on the turbine blades 9 and the reaction force which is generated right before the gas flows out to the outside of the turbine impeller 6 is converted to rotational drive force, so the kinetic energy of the gas is converted to a rotational drive force at an extremely high efficiency.

Such a spindle system of the third embodiment can be applied to an electrostatic painting system. The electrostatic painting system is provided with a spindle system, a bell cup paint applicator (not shown) for scattering and atomizing paint, feed pipes (not shown) for feeding, for example, paint and thinner to the bell cup, and a high voltage generator (not shown) which applies a charge to the paint. A paint feed pipe and thinner feed pipe are inserted through the inside of the hollow rotary shaft 2, while a bell cup is attached to a front end of the rotary shaft 2 in a rotatable manner integrally with it.

A high voltage generator is used to place the inside of the rotary shaft 2 in a high voltage electrostatic field while the gas is blown against the turbine blades 9 of the turbine impeller 6 and makes the rotary shaft 2 rotate at a high speed. In that state, paint and thinner are supplied to the bell cup through the paint feed pipe and thinner feed pipe which pass through the inside of the rotary shaft 2. This being so, electrostatically atomized paint is sprayed from the bell cup which rotates at a high speed at the front end of the rotary shaft 2 on to the painted object. Due to this, the painted object can be painted. If changing the size, shape, etc. of the bell cup, various painted objects can be painted.

Note that, the third embodiment shows one example of the present invention. The present invention is not limited to the third embodiment. For example, if there is no damage due to centrifugal force and damage due to repeated stress, the material of the turbine blades 9 is not particularly limited. Accordingly, if using a small density material to form the turbine blades 9, the time from the start of rotation to when a predetermined rotational speed is reached becomes short, so, for example, when applying the spindle system to an electrostatic painting system, the time for painting work can be shortened.

Further, the type of the gas which is blown on the turbine blades 9 of the turbine impeller 6 is not particularly limited. Compressed air or other air and also nitrogen, steam, or other type of gas can be used.

REFERENCE SIGNS LIST

1 housing
2 rotary shaft
3 gas feed part
4 porous member
5 porous member
6 turbine impeller
6*a* flat surface
6*b* flat surface
7 magnet
8 turbine impeller
8*a* plate surface
9 turbine blades
9*a* boundary part
9*b* side surface
10 nozzle
21 front surface
21*a* projecting columnar surface having radius of curvature R2
21*b* projecting columnar surface having radius of curvature R3

21c flat surface
22 rear surface
31 inlet
32 outlet
41 tangent plane
42 tangent plane
43 tangent plane
56 flange part
56a flat surface

The invention claimed is:

1. A spindle system comprising a substantially tubular housing, a rotary shaft inserted through the housing and supported through a bearing in a rotatable manner, a turbine impeller provided concentrically with the rotary shaft and rotating integrally with the rotary shaft, a nozzle ejecting a gas for making the turbine impeller rotate, and a plurality of turbine blades formed at the turbine impeller and receiving the gas ejected from the nozzle, wherein:
the plurality of turbine blades are arranged in a ring along an outer circumference of the turbine impeller,
the intervals between adjoining turbine blades are equal intervals,
each turbine blade is provided with a front surface oriented to a front in a rotational direction of the turbine impeller and a rear surface oriented to a rear in a rotational direction of the turbine impeller,
the rear surface is a recessed columnar surface having a radius of curvature R1, while the front surface is a smooth continuous surface comprised of a projecting columnar surface having a radius of curvature R3 smaller than R1, arranged between a projecting columnar surface having a radius of curvature R2 larger than R1 and a flat surface,
a space sandwiched between a facing front surface and rear surface of two adjoining turbine blades forms a channel through which the gas flows in a direction along an arc-shaped curve of the recessed columnar surface,
gas ejected from the nozzle flows in from an opening at one end side of the channel, flows in at a direction along the arc-shaped curve of the recessed columnar surface, and flows out from an opening at another end side,
the projecting columnar surface having a radius of curvature R2 among the three surfaces forming the front surface is arranged at an inlet side of the channel across the projecting columnar surface having a radius of curvature R3,
the flat surface is arranged at an outlet side of the channel,
the turbine impeller is a disk shaped member separated from the rotary shaft,
a through hole is formed at a center of the turbine impeller,
the turbine impeller is attached to the rotary shaft inserted through the through hole,
the plurality of turbine blades are formed at one plate surface of two plate surfaces of the turbine impeller, and
a deformation suppression part supporting the turbine impeller and suppressing deformation of the turbine impeller in the axial direction is provided at the rotary shaft such that the deformation suppression part is in contact with the other plate surface of the turbine impeller, wherein the other plate surface is an opposite side of the turbine impeller from the one plate surface with the plurality of turbine blades, the other plate surface being perpendicular to the axis direction.

2. The spindle system as set forth in claim 1, wherein the material forming the deformation suppression part has a higher tensile strength than the material forming the turbine impeller.

3. The spindle system as set forth in claim 1, wherein each turbine blade is formed projecting out from the one plate surface of the turbine impeller and a shape of the each turbine blade is that a projecting length from the one plate surface of the turbine impeller is not constant.

4. The spindle system as set forth in claim 3, wherein a shape of a boundary part of the turbine blade with the turbine impeller is that a projecting length from the one plate surface of the turbine impeller is not constant.

5. The spindle system as set forth in claim 4, wherein a cross-sectional shape of an outside surface of the boundary part cut at a plane along a projecting direction of the turbine blade is a curve.

6. The spindle system as set forth in claim 5, wherein the curve is an arc.

7. The spindle system as set forth in claim 6, wherein the are has a radius of curvature of 0.1 mm to 0.5 mm.

8. The spindle system as set forth in claim 1, wherein:
an angle between a tangent plane at the outlet-side end of the rear surface and a tangent plane at the outlet-side end of a rotational path of the outlet-side end of the rear surface is 20° to 50°,
the flat surface of the front surface faces the rear surface of the adjoining turbine blade, but is parallel with the tangent plane at the outlet-side end of the facing rear surface, and
a distance B which is a distance between the flat surface of the front surface and the tangent plane at the outlet-side end of the rear surface of the adjoining turbine blade facing the flat surface is less than a distance A which is a distance between the furthest part from the inlet of the channel in the projecting columnar surface having a radius of curvature R2 and the inlet-side end in the rear surface of the adjoining turbine blade facing the projecting columnar surface.

9. The spindle system as set forth in claim 1, wherein an angle formed between an ejection direction of the gas ejected from the nozzle and the inlet-side end of the recessed columnar surface forming the rear surface receiving the gas is 75° to 105°.

10. An electrostatic painting system provided with a spindle system as set forth in claim 1.

* * * * *